(12) United States Patent
Pacor et al.

(10) Patent No.: US 9,532,095 B2
(45) Date of Patent: Dec. 27, 2016

(54) MOBILE DEVICE WITH SMART GESTURES

(71) Applicant: Kangaroo Media, Inc., Boisbriand (CA)

(72) Inventors: Victor J. Pacor, New York, NY (US); Charles John O'Byrne, New York, NY (US); Jean Arseneau, Blainville (CA); Alain Charette, St. Jerome (CA); Uday Ahuja, New York, NY (US)

(73) Assignee: FANVISION ENTERTAINMENT LLC, New York, NY (US)

( * ) Notice: Subject to any disclaimer, the term of this patent is extended or adjusted under 35 U.S.C. 154(b) by 0 days.

(21) Appl. No.: 13/689,676

(22) Filed: Nov. 29, 2012

(65) Prior Publication Data

US 2014/0150032 A1   May 29, 2014

(51) Int. Cl.

| | |
|---|---|
| *H04N 7/16* | (2011.01) |
| *G06F 3/00* | (2006.01) |
| *G06F 13/00* | (2006.01) |
| *H04N 5/445* | (2011.01) |
| *H04N 21/41* | (2011.01) |
| *H04N 21/218* | (2011.01) |
| *H04N 21/2187* | (2011.01) |
| *H04N 21/414* | (2011.01) |
| *H04N 21/433* | (2011.01) |
| *H04N 21/472* | (2011.01) |
| *H04N 21/654* | (2011.01) |
| *G06F 3/0487* | (2013.01) |

(Continued)

(52) U.S. Cl.
CPC .......... *H04N 21/4126* (2013.01); *G06F 3/017* (2013.01); *G06F 3/0346* (2013.01); *G06F 3/0487* (2013.01); *H04N 21/2187* (2013.01); *H04N 21/21805* (2013.01); *H04N 21/41407* (2013.01); *H04N 21/4331* (2013.01); *H04N 21/472* (2013.01); *H04N 21/654* (2013.01)

(58) Field of Classification Search
USPC .............................................. 725/38, 59, 62
See application file for complete search history.

(56) References Cited

U.S. PATENT DOCUMENTS 5,610,653 A * 3/1997 Abecassis .................... 348/170
6,633,232 B2 * 10/2003 Trajkovic et al. ......... 340/573.1
(Continued)

OTHER PUBLICATIONS

PCT International Search Report dated Feb. 7, 2014, PCT Patent Application No. PCT/US2013/072163.
(Continued)

*Primary Examiner* — Brian T Pendleton
*Assistant Examiner* — Alexander Gee
(74) *Attorney, Agent, or Firm* — Vierra Magen Marcus LLP

(57) ABSTRACT

Methods for automatically buffering and displaying video feeds associated with a live event are described. The video feeds displayed on the mobile device may comprise live video feeds or replays associated with the live event. A replay may comprise a playback of one or more buffered video feeds in a particular sequence and at a particular playback rate. The particular sequence may be determined based on the viewing behavior of the end user of the mobile device and/or the viewing behaviors of one or more other end users using other mobile devices at the live event. In some cases, the replay may comprise a shared replay in which a group of end users attending the live event may interact with each other while sharing a common replay.

19 Claims, 24 Drawing Sheets

(51) Int. Cl.
*G06F 3/01* (2006.01)
*G06F 3/0346* (2013.01)

(56) References Cited

U.S. PATENT DOCUMENTS

| | | | |
|---|---|---|---|
| 7,376,388 B2* | 5/2008 | Ortiz et al. | 455/3.06 |
| 7,683,937 B1* | 3/2010 | Blumenfeld | 348/211.11 |
| 2006/0195882 A1* | 8/2006 | Tischer | H04N 7/16 |
| | | | 725/116 |
| 2007/0022446 A1* | 1/2007 | Arseneau et al. | 725/74 |
| 2008/0052751 A1 | 2/2008 | Cromarty | |
| 2008/0138029 A1* | 6/2008 | Xu | G06F 17/30787 |
| | | | 386/228 |
| 2009/0009605 A1* | 1/2009 | Ortiz | H04N 5/232 |
| | | | 348/157 |
| 2009/0292376 A1* | 11/2009 | Kazem | H04N 5/44543 |
| | | | 700/94 |
| 2009/0319181 A1 | 12/2009 | Khosravy | |
| 2010/0077441 A1* | 3/2010 | Thomas | G06F 3/1415 |
| | | | 725/133 |
| 2010/0150525 A1* | 6/2010 | Walker | 386/69 |
| 2011/0018997 A1 | 1/2011 | Ortiz | |
| 2011/0302527 A1* | 12/2011 | Chen et al. | 715/800 |
| 2012/0082424 A1* | 4/2012 | Hubner | H04N 21/242 |
| | | | 386/219 |
| 2012/0246689 A1 | 9/2012 | Thomas | |
| 2015/0089520 A1* | 3/2015 | Lee et al. | 725/14 |

OTHER PUBLICATIONS

PCT Written Opinion of the International Searching Authority dated Feb. 7, 2014, PCT Patent Application No. PCT/US2013/072163.

* cited by examiner

MOBILE DEVICE WITH SMART GESTURES

BACKGROUND

The concept of delivering live video and/or audio content associated with a live event, such as a soccer game or a music concert, to spectators attending the live event is known. One approach uses a local transmission station to broadcast video and/or audio content over the air to handheld electronic devices operated by individual spectators at the live event. An end user of a handheld electronic device can then select a particular video or audio channel of interest on the handheld electronic device while watching the live event. This capability allows the end user to select various perspectives or angles for viewing the live event. However, one drawback of some content delivery systems is that the end user of a handheld electronic device must be actively engaged in determining which channels associated with the video and/or audio content to view. Moreover, some content delivery systems do not provide an environment in which a group of spectators at the live event may interact with each other and share their viewing experiences.

DETAILED DESCRIPTION

Figure 1:
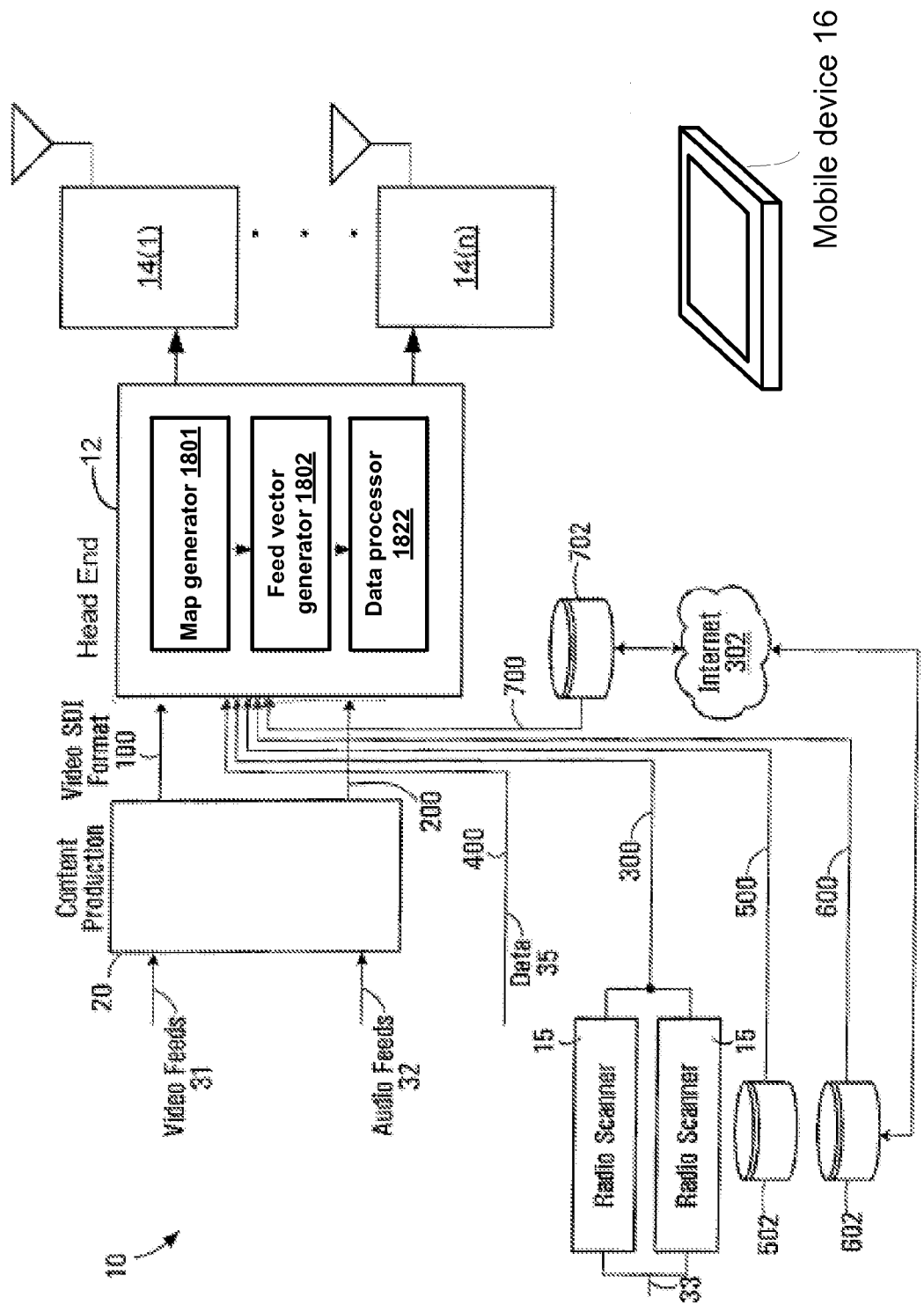
FIG. 1 depicts one embodiment of a content delivery system for delivering video information and/or audio information to mobile devices at a live event.

Technology is described for automatically buffering and displaying video feeds associated with a live event. In some cases, the video feeds displayed to an end user of a mobile device may be determined based on the viewing behaviors of one or more other end users using other mobile devices at the live event. The video feeds displayed on the mobile device may comprise live video feeds or replays associated with the live event. A replay may comprise a playback of one or more buffered video feeds in a particular sequence and at a particular playback rate. The particular sequence may be determined based on the viewing behavior of the end user of the mobile device and/or the viewing behaviors of one or more other end users using other mobile devices at the live event. The mobile device may automatically display a particular replay in response to a replay triggering event. The replay triggering event may comprise a momentary pause in action occurring at the live event (e.g., after the end of a play in football or after an out in baseball). In some cases, the replay may comprise a shared replay in which a group of end users attending the live event may interact with each other while sharing a common replay.

A spectator attending a live event may use a mobile device to improve their experience of the live event. The mobile device may acquire video information and/or audio information associated with the live event in real time. The video information may be used by the mobile device to push varying perspectives of the live event to an end user of the mobile device in real time. The video and/or audio information may allow the end user to interact with and share different experiences and/or perspectives of the live event with other spectators at the live event in real time. The video and/or audio information may be transmitted or broadcast to the mobile device via a set of high-bandwidth, local wireless channels (e.g., a dedicated ultra-high frequency channel). In one embodiment, the video information may include a plurality of live video feeds associated with a plurality of cameras capturing the live event. The video information may also include video feed support information describing field of view information for each of the plurality of live video feeds.

The mobile device may simultaneously buffer a selected group of video feeds based on predicted future use of the video feeds by the end user of the mobile device. In one embodiment, behavioral analysis of the viewing habits of a group of end users at the live event (e.g., which camera angles or replays are being viewed by other spectators at the live event) may be used for selecting video feeds associated with the live event to be automatically buffered and/or displayed. The group of end users may be determined based on various characteristics such as a physical location of each of the group members (e.g., each of the group members may be located within a particular seating area or section at a venue), one or more common interests (as provided in user profiles associated with each of the group members), and/or a degree of closeness associated with a social graph or social networking graph.

In some embodiments, two mobile devices may view a shared replay by exchanging video feed identification information and replay timing information (e.g., synchronization information and/or replay playback rate information) via a wireless connection between the two mobile devices. The wireless connection may comprise a WiFi or other local wireless connection. The video feed identification information may correspond with one or more video feeds already buffered by the two mobile devices (i.e., in this case, the wireless connection between the two mobile devices may not be used for transmitting the actual video feeds). In other embodiments, a first mobile device may publish or transmit a replay stream to a second mobile device in real time so that both the first mobile device and the second mobile device may experience the replay stream at substantially the same time.

A venue for hosting a live event may include a plurality of cameras (e.g., TV cameras) distributed throughout the venue for capturing the live event. The venue may comprise a particular structure (e.g., a stadium or arena) or a place particularly suited for hosting the live event (e.g., a golf course). The live event may comprise a music concert or play. The live event may also comprise a live sporting event, such as a football game, soccer game, baseball game, tennis match, or golf tournament. The cameras may comprise television broadcast cameras or high-resolution digital cameras. In one example, the cameras may include a 720p high-definition serial digital interface (HD-SDI) camera capturing 60 frames per second.

The cameras may be positioned at different locations throughout a venue and/or oriented in different directions to capture varying perspectives of a live event as the live event occurs. For example, the cameras may capture various views at the live event such as a portion of a playing field, sidelines, and/or spectator seating areas. In some cases, the location and/or viewing angle associated with a particular camera may vary over time. For each camera at the venue, the camera's position, viewing angle, and/or other metrics for determining a field of view for each camera may be transmitted to mobile devices throughout the venue along with the video feeds.

FIG. 1 depicts one embodiment of a content delivery system 10 for delivering video information and/or audio information to mobile devices. The content delivery system 10 may be used at a live event, such as a live sporting event, in order to provide real-time video information to the mobile devices at the live event.

As depicted, the content delivery system 10 includes a head end 12, transmitters 14(1)-14(n), and mobile device 16. Although only one mobile device is depicted, the content delivery system 10 may support more than one mobile device. In one example, the content delivery system may support over a hundred thousand mobile devices. The mobile device 16 may comprise a handheld electronic device, such as a mobile phone or tablet PC.

Transmitters 14(1)-14(n) may send one or more wireless transmissions to the mobile device 16. Transmitters 14(1)-14(n) may include different transmitters that are capable of different types of wireless transmissions. For example, a wireless transmission may be provided over a wireless local area network or a cellular network. The wireless transmission may comprise a Wireless Fidelity (WiFi) transmission, Bluetooth transmission, ultra-high frequency (UHF) transmission, or any other wireless RF transmission. In one embodiment, transmitters 14(1)-14(n) may provide unidirectional communication from transmitters 14(1)-14(n) to mobile device 16. In another embodiment, transmitters 14(1)-14(n) may provide bi-directional communication between the head end 12 and mobile device 16.

In one embodiment, head end 12 may transmit a plurality of live video feeds via one or more UHF channels to mobile device 16 and transmit video feed support information, event flagging and location information, and/or other venue-related support information via one or more WiFi channels. In some cases, a wireless support attachment or dongle may be added to a mobile device in order to support wireless transmission from transmitters 14(1)-14(n). In some embodiments, the plurality of live video feeds, video feed support information, event flagging and location information, and other venue-related support information may be transmitted to mobile device 16 using a single wireless RF signal that is received by a single tuner on the mobile device 16.

The bi-directional communication feature may be implemented to provide identical or similar bandwidths over the receive and transmit links. However, in some cases, this may not be necessary since the amount of information that needs to be sent from the mobile device 16 may be different from the amount of information that it needs to receive. For example, the mobile device 16 may need to send far less information than that it receives. The implementation using a cellular network is an example that would provide a sufficient bandwidth over the transmit link. By "cellular" network it is meant a network that uses a series of cells having a limited geographical extent within which communication services are available. In one possible form of implementation, such cells can be arranged to provide a hand-off to moving mobile devices, such as mobile device 16, moving outside a cell and entering a new cell, the communication services as seamlessly transferred from one cell infrastructure to another cell infrastructure. The "cellular" network terminology encompasses both communication infrastructures using licensed bandwidth, such as typical cellular telephones based on Code Division Multiple Access (CDMA), Time Division Multiple Access (TDMA), Groupe Station Mobile (GSM), or other technologies, and communication infrastructures using unlicensed bandwidth, such as Wireless Fidelity (WiFi) that is used commonly to provide wireless access to computer networks. Another possible example of a suitable technology is the so called "Bluetooth" protocol that provides very short range wireless communication capabilities.

The cellular link allows the mobile device 16 to transmit information over a relatively limited bandwidth; however, in most cases the amount of information that needs to be sent is low such that available bandwidth should suffice. On the other hand, the receive link has a higher bandwidth in order to accommodate the multiple video streams and the other data that is to be sent to the mobile device 16. Also, the cellular link (as well as other wireless links) may allow mobile devices to transmit information independently from one another.

The head end 12 includes a map generator 1801 that generates a map of the venue. The map may include a 3D model of the venue. The map of the venue may include camera locations and/or camera orientations relative to the 3D model. The head end 12 includes a feed vector generator 1802 that generates video feed vectors. Each video feed transmitted from the head end 12 may correspond with a particular video feed vector describing a field of view or a viewing direction associate with the video feed. Each video feed vector may be specified relative to a 3D model of the venue. The head end 12 includes a data processor 1822 that generates and combines the outputs of the head end 12.

The head end 12 receives content that originates from various sources. The content can be formatted or edited before being input into the head end 12. As depicted, a number of content sources may be used. There are multiple video feeds (or streams) 31 that originate from cameras located at a venue. The different cameras may simultaneously capture different images (or video) of the same live sporting event and output video information making up the respective video feeds 31. Multiple audio feeds (streams) 32 may also be provided, where each audio feed 32 (or a subset of audio feeds) is associated with a video feed 31. An audio feed 32 conveys audio information such as the noise picked up by a microphone at a location at which the associated camera is placed, or an audio commentary. Such audio commentary can be the speech picked up by a microphone from a commentator or any individual that appears in one or more of the video feeds.

The content sources also include real time data content 35. The real time data content 35 conveys information relating to the event. For example, the real time data content in the context of motor sports, such as a car race, can be time and ranking information, lap times, position of the various cars on the track, physiological information about a driver, among many others. Examples of real time data for a football game include time remaining score, box score information, players currently on the field, list of plays run by each team, etc. In some cases, the real time data content 35 may be used to determine which video channels to buffer in a mobile device.

The video feeds 31 and the audio feeds 32 may be edited at a content production station 20. The content production station 20 provides a facility where an operator can format or edit the raw content to make it more suitable for presentation to the audience. The content production station 20 includes a console that allows the operator to conduct the necessary content editing operations. As depicted, the head end 12 receives seven different inputs.

Examples of various inputs 100-700 will now be described. Note that the inputs 100-700 may come from a wide variety of sources. It is not required that the inputs 100-700 come from the same source. The first input, designated by reference numeral 100 includes the multiple edited or unedited video feeds that may be transmitted according to a Serial Digital Interface (SDI) format, or another format. Note that the video feeds might come from different sources. For example, some video feeds might come from a national television network that is covering a football game, others might come from a local television network covering the football game, and still others might come from a television network that is covering a different football game. The second input 200 includes the multiple edited or unedited audio feeds 32 that are associated with respective video feeds 31. The third input 300 includes the independent audio feeds 33. An independent audio feed 33 may convey voice conversations or audio commentaries picked up by a radio scanner 15 or other type of sensor.

The fourth input 400 includes the real time data content 35 that may be transmitted digitally to the head end 12. In one example, the real time data content includes information relating to the live sporting event, such as for example scoring and participant ranking information, among others. In the specific example of a car racing event, the real-time information can include: the current ranking (e.g., first place, second place, etc.), number of laps remaining, participants still in the race, participants no longer in the race, fastest lap of the current leader or of anyone of the participants, average speed of the current leader or of anyone of the participants, present speed of any one of the participants, Revolutions Per Minute (RPM) of the engine of anyone of the participants, or the engaged gear in the transmission of any one of the participants. In the context of a football game the real time data 35 may include the present score, the time remaining, penalties, number of time outs left, plays run, participants on the field, current down and distance to go for a first down.

The fifth input 500 includes authentication data received from an authentication database 502. The sixth input 600 includes ancillary content that is output from an ancillary information database 602. The ancillary content 600 can be in the form of video, audio or data, such as text for display to the spectator. Examples of ancillary content includes, advertisement content, venue or event related contextual content, news, weather, and shopping information.

The ancillary content 600 can be obtained from a wide variety of sources. The advertisement, shopping, venue or event related information can be recorded on any suitable medium and injected in the video/audio content at the head end 12. Specifically, the advertisement, shopping, venue or event related information could be digitally stored on a database 602. The output of the database 602 leads to the head end 12 such that the video/audio content in the database 602 can be injected in the video/audio content that is being broadcast to mobile devices, such as mobile device 16. The Internet 302 (or other global network) is another source of ancillary content. Specifically, the news service can be delivered from the Internet and injected in the video/audio content that is being broadcast from the head end 12.

The seventh input 700 includes service data. The service data resides in a database 702. This database can also connect to the Internet to obtain updates or program releases that may not be available prior to the beginning of the event being serviced by the system 10. An example of service data includes, but is not limited to, data for setting the software running one or more handheld electronic devices. For example, the service data may be used to upload an entirely new or portions of a Graphical User Interface (GUI) to one or more handheld electronic devices, such as mobile device 16, in order to customize the handheld electronic devices for the event.

Figure 2A:
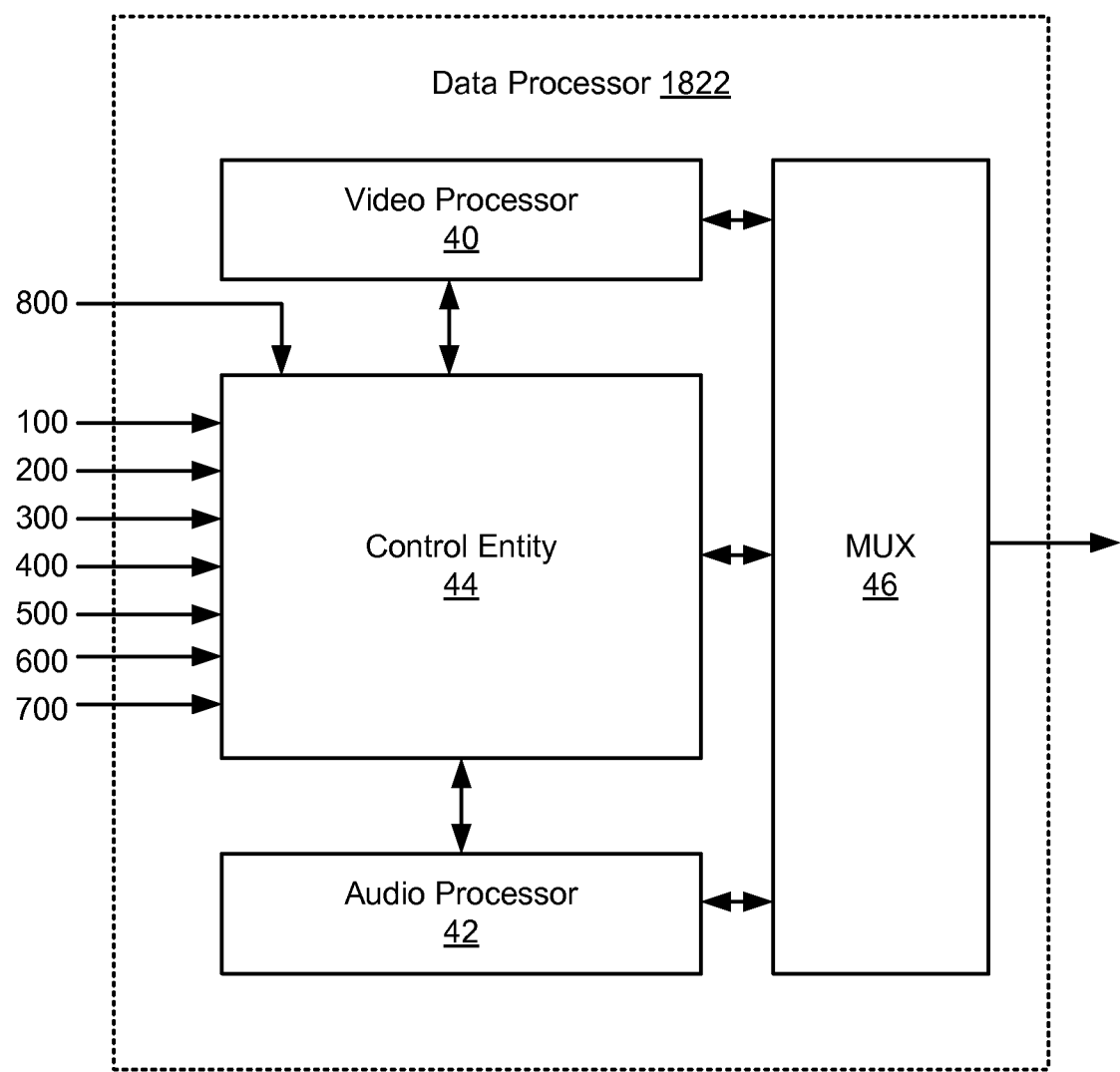
FIG. 2A depicts one embodiment of a data processor.

FIG. 2A depicts one embodiment of a data processor, such as data processor 1822 of the head end 12 of FIG. 1. The head end 12 organizes the data from various inputs into a structured information stream for broadcasting to the various electronic devices, such as mobile device 16 in FIG. 1. In one embodiment, all of the video, audio and data are transmitted to mobile devices in a single RF transmission/signal. Note that it is not required that all of the data be transmitted in the same RF transmission. For example, the video, audio, and data can be sent in different wireless transmissions. For example, the video might be sent in one wireless transmission and the separate audio streams sent in a different wireless transmission. The head end 12 includes a video processor 40, an audio processor 42, a control entity 44, and a multiplexer 46. The control entity 44 may be implemented using one or more computing devices running one or more software programs to carry out various tasks. The one or more computing devices may provide a Graphical User Interface that provides an operator with the ability to send commands to the control entity 44 or to receive information therefrom. The GUIs can take various forms.

For instance, a GUI can include a display on which information is shown to the operator and a keyboard and mouse combination for data and commands entry.

In some implementations, the video processor 40, audio processor 42 and/or MUX 46 are implemented by a software program or set of software programs that execute on one or more processors. In some implementations, the control entity 44 is implemented at least in part with hardware. For example, an application specific circuit (ASIC) may be used to implement the control entity 44. The video processor 40, audio processor 42, and MUX 46 may also be implemented with an ASIC, custom integrated circuit, or other hardware. Video processor 40 and audio processor 42 can also be implemented using microprocessors known in the art. In some embodiments, video processor 40, audio processor 42, control entity 44, and mux 46 can be implemented as separate computers, each having their own microprocessor. In other embodiments, two or more of the components can be implemented on a common computer.

Control entity 44 receives supplementary information 800 (e.g., video feed support information, event flagging and location information, and/or other venue-related support information) such that it may pass it to the MUX to insert into the RF transmission with other input information (e.g., inputs 100, 200, 300, 400, 500, 600, and 700). Some of the information (e.g., video feeds 100, audio feeds 200) may be directed to the appropriate encoders for processing. For example, all the video feeds that are received at the first input of the control entity 44 are switched to a video processor 40 that will convert the SDI format (or other format) into Moving Picture Experts Group (MPEG)-4 format. Note that the video processor 40 could convert the input video into a format other than MPEG-4. Each video stream may be compressed to provide at a handheld electronic device a moving image at 30 Frames per second (fps), 16 bit colors at a 480×272 pixels resolution (or other resolution). In one example, the resulting bit rate may be 384 Kbits/sec. However, other frame rates, bit rates, and resolutions could be used. Since the video processor 40 may handle multiple video feeds simultaneously it may be designed in order to be able to process those feeds in parallel. One implementation uses a plurality of encoder stations, each being assigned a video feed 31. The encoder stations can be based on dedicated video processing chips or purely on software, or a combination of both. Alternatively, the video processor 40 can use a single processing module with buffering capabilities to sequentially handle blocks of data from different video feeds 31. With an adequate size buffer and a processing module that is fast enough, all the video feeds 31 can be encoded without causing loss of data.

In one embodiment, the outputs of the control entity 44, the video processor 40, and the audio processors 42, are passed to a multiplexer 46 that combines the data into one common data stream. In one example, time multiplexing can be used. The data stream may then be directed to a transmitter, such as transmitter 14(1)-14(n) of FIG. 1, that produces a single wireless RF transmission broadcasting the information to the various mobile devices. In some cases, a transmitter may be designed to use a single 6 MHz contiguous channel bandwidth to broadcast the entire payload to the various mobile devices. The bandwidth might also be 7 MHz, 8 MHz or another bandwidth. Note that it is not required that the data be sent in a contiguous channel bandwidth. For example, the video and audio may be sent in non-contiguous channels of the same type of RF transmission. However, note that it is not required that the video, audio, and data be sent in the same type of RF transmission. As an example, the video channels might be sent in 6 MHz channel (or some other bandwidth) with other data (e.g., separate audio channels or other data) being sent in a Wi-Fi transmission or cellular transmission. Note that video, audio, and other data may be sent in more than two different types of wireless transmissions.

As mentioned, the data stream may be compliant with the MPEG-4 protocol, but that is not required. In some aspects, the data stream has a digital container format that encapsulates packetized elementary streams and other data. In some aspects, a packet is the basic unit of data in the transport stream. As an example, a packet could be 188 bytes in length; however packets can include more or fewer bytes depending on the protocol in use. Each packet may include a Packet Identifier (PID), which in some implementations is a 13-bit value. In some aspects, each video stream is an elementary stream that is broken into a number of packets. Each of the packets in an elementary video stream may be given the same PID. Therefore, when the handheld device receives the RF transmission, the device may extract a certain video stream by looking for packets with a certain PID. An audio stream may also constitute an elementary stream in which all packets of a given audio stream are assigned the same PID. Packets associated with data other than video and audio may also have PIDs.

In one embodiment, the control entity 44 sends information to the handheld devices that identify which of the video channels should be buffered. In one embodiment, the control entity 44 sends commands to the handheld electronic devices that tell the handheld devices whether to buffer only the video stream or both the audio and the video stream of a video channel. These commands may be inserted into the wireless RF transmission.

Figure 2B:
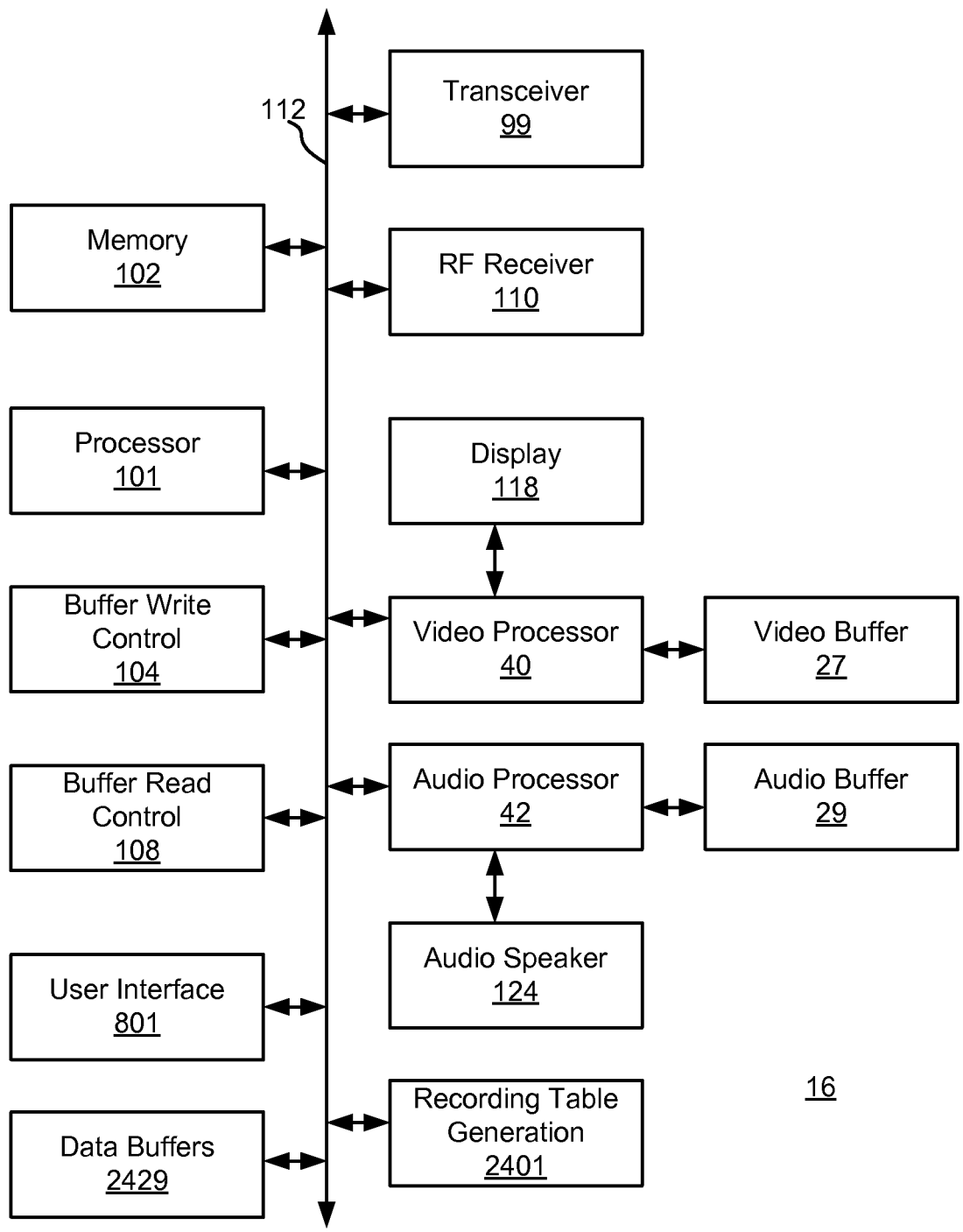
FIG. 2B depicts one embodiment of a mobile device.

FIG. 2B depicts one embodiment of a mobile device 16. The mobile device 16 may be a handheld electronic device that receives video and/or audio information sent by transmitters 14(1)-14(n) of FIG. 1. The video information may be displayed on the display 118 and the audio information may be presented via an audio speaker 124 (e.g., headphones). A spectator can control the selection of video channels as well as to perform other operations. A video channel may include video information, or a combination of video information and audio information.

Mobile device 16 has a processor 101 that executes software for controlling the various functions of the mobile device 16. In one example, the data for setting the GUI in the mobile device 16 may be sent wirelessly from a transmitter that is used to send the wireless RF transmission conveying the payload (e.g., video information and audio information). In one example, the data for effecting the GUI setting is sent during a window of operation that precedes the beginning of the transmission of the video streams. For instance, in the context of motor sports, such as a car race, this can be done before the race event starts. In another example, the data for setting the GUI is sent along with the payload. As far as the mobile device 16 is concerned, after the data for configuring the GUI is received it is loaded such that the spectator will be presented with the new GUI. When an authentication process is required to allow the mobile device 16 to access the video streams, the actual loading of the new GUI can be deferred until the authentication has been completed. In one example, a LINUX kernel is used to provide common core services, such as memory management, task scheduling and user interfacing, among others. Other operating systems may also be used. In some cases, the algorithms to decode the video and audio information broadcasted by a transmitter may be implemented in hardware, software, and/or a combination of hardware and software.

Software for operating the mobile device 16 may be stored in a memory 102. Memory 102 may comprise a computer readable storage device. The memory 102 may include a Read Only Memory (ROM) portion that includes data intended to be permanently retained such as the program code that the processor 101 executes. In addition, the memory 102 may also include a Random Access Memory (RAM) portion that temporarily holds data to be processed. The memory 102 can be implemented as a single unit, for instance as a semiconductor-based module or may include a combination of a semiconductor-based module and a mass-storage device, such as a hard-drive. A computer readable storage device can be any available storage device that can be accessed by the electronic device. A computer readable storage device includes volatile and nonvolatile, removable and non-removable media implemented in any method or technology for storage of information such as computer readable instructions, data structures, program modules or other data. Computer readable storage devices may include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other storage device which can be used to store the computer readable instructions and which can accessed by the electronic devices.

User interface 801 allows the spectator to control the operation of the mobile device 16. The user interface 801 may include a physical or virtual keypad. The number and type of keys forming the keypad may be a matter of choice depending upon the specific application. As a possible variant, a touch sensitive screen or a voice recognition capability may be used to replace or to supplement data entry via the keypad.

The mobile device 16 has a wireless RF receiver 110 and demodulator that senses the wireless RF transmission, demodulates it and delivers it as properly organized and formatted data blocks to a data bus 112. The data sent over the data bus 112 may be made available to the memory 102 and the processor 101. In one example, the wireless RF receiver 110 and demodulator operates in the Ultra High Frequency (UHF) range, specifically in the sub range of 470 MHz to 806 MHz. A 6 MHz contiguous bandwidth (equivalent to one regular TV channel) is sufficient to transmit the exemplary payload indicated earlier. Alternatively, the transmission may also be made in the 2.5 GHz range or another range. Thus, the mobile device 16 is not limited to any particular frequency range. In one embodiment, the wireless RF receiver may include one tuner mechanism that is permanently tuned to one frequency. The signal received at that frequency may include various video channels, which are extracted and communicated to the memory 102 and the processor 101 for processing as described herein. A tuner may comprise a component (e.g., electrical circuit) which passes one radio frequency, or band of frequencies, and excludes others. A tuner may perform the process of selecting the desired signal. In some embodiments, a tuner may be adjustable.

The mobile device 16 includes a transceiver 99 that is capable of bi-directional communication. For example, the transceiver 99 may be able to communicate over a cellular telephone network so that mobile device 16 receives the video channels over the cellular network. In some embodiments, transceiver 99 may include a single tuner that receives the appropriate single cellular signal. In one embodiment, the transceiver 99 communicates over a WiFi network.

Video processor 40 may include a video decoder to perform the decoding of the video channels received from the wireless RF receiver and demodulator 110. For clarity it should be mentioned that while the specification refers to the decoder as "video" decoder it also performs audio decoding on the audio information associated with the video streams. The video processor 40 may include a memory in the form of a buffer that will hold undecoded video/audio information representing a certain duration of video channel presentation. For instance the size of the buffer may be selected such that it holds 5 minutes of video channel presentation, for each channel or a subset of channels. In use, the video/audio information not yet decoded that is received from the wireless RF receiver and demodulator 110 is sent over the data bus 112 to the video processor 40. The video processor 40 decodes the video/audio information and then directs it to a display screen 118 to be viewed by the spectator. At the same time the undecoded video/audio information is directed to the memory buffer that starts to fill. When the memory buffer is completely filled, it may start overflowing such that only the last "n" minutes of the video channel are retained. The same operation may be performed on every video channel, with the exception that only the video channel the spectator wants to watch is being decoded and directed to the display screen 118. Accordingly, the memory buffer may be segmented in the functional sense into partitions, where each partition is associated with a different video channel. In other embodiments, video buffer can include multiple memory chips, with each memory chip buffering a different video stream. Note that it is not required that every video channel be buffered at all times. In some implementations, the head end provides information that informs the mobile device which video channels should be buffered. In some embodiments, the determination of which video channels to buffer is made at the mobile device 16.

The audio stream that is associated with the video channel being watched may be decoded, converted into an analog format, amplified and directed to audio speaker 124 (e.g., headphones) such that the spectator can watch the video stream on the display screen 118 and hear the audio simultaneously.

The ability to retain the last "n" minutes of video channel provides the spectator with interesting possibilities. For instance, the spectator can manipulate the data in the memory buffer 27 so as to "playback" a certain video channel content, create fast forward motion, "rewind" motion and record the video/audio information in the memory buffer 27. Moreover, the spectator can see any action that may have been missed by switching channels and then "rewinding" the content of the memory buffer 27 associated with the newly selected channel.

The mobile device 16 is capable of generating recording tables that define which video streams are to be buffered in the video buffer 27 and/or which audio streams are to be buffered in audio buffer 29. In one embodiment, audio buffer 29 is partitioned into multiple buffers for separately buffering different audio streams. There is also a data buffer 2429 for buffering data other than video and audio from the RF transmission.

In addition, the spectator can create "bookmarks" to identify a portion of a video feed that they may wish to revisit. A "bookmark" marks a location in the video stream. For instance a "bookmark" can be in the form of a pointer to a specific address of a video feed stored in the buffer.

When accessing a bookmark it thus suffices to present the video content starting from the address to which the bookmark points to.

Such "bookmarks" may be created by a spectator by selecting an option provided in one of the GUI menus of the user interface. The spectator navigates the menu by operating keys on the keyboard. Those keys may be arrow keys or any other suitable keys. When a selection has been made, the choice or option can be activated by pressing any suitable key such as an "enter" key.

In some embodiments, memory buffer 27 is in the form of a semiconductor based memory (e.g., RAM, flash memory, etc.). In applications where large memory capacity is required in order to store a large video content, a storage device such as a hard drive can be used. As mentioned, buffer can be one large memory chip, or multiple chips. The memory buffer 27 may comprise a multi-port memory (e.g., a dual-port memory) that allows both reads and writes to occur at the same time.

The display screen 118 can be of any suitable type. One possibility is to use a 4.2 in diagonal transreflective Thin Film Transistor (TFT) screen capable of rendering 480×272 pixel resolution images with 16 bit color depth. Other display types can be used. Optionally, the mobile device 16 can be provided with a lighting system (not shown in the drawings) using Light Emitting Diodes (LEDs) to facilitate viewing under low light level conditions. The display screen could also be a liquid crystal display (LCD). In some embodiments, the display screen 118 also serves as a user input. For example, the display screen 118 may be touch sensitive such that the user can select a menu item simply be touching with a finger or other object. In one embodiment, the user can slide a finger over the video to command mobile device 16 to rewind or fast forward the video.

The mobile device 16 includes buffer write control 104 and buffer read control 108. The buffer write control 104 may include circuitry for controlling the writing of data to one or more video feed buffers, such as video buffer 27. The one or more video feed buffers may comprise multi-port memories that allow for both reads and writes to be performed at substantially the same time. The buffer write control 104 may receive one or more identifications of video feeds to buffer, as well as video feed support information to be buffered along with each of the video feeds identified. The buffer write control 104 may utilize write pointers corresponding with one or more locations in each of the one or more video feed buffers associated with a current recording time. The buffer read control 108 may include circuitry for controlling the reading of data from the one or more video feed buffers, such as video buffer 27. The buffer read control 108 may utilize read pointers corresponding with one or more locations in each of the one or more video feed buffers associated with a previous recording time.

In some embodiments, over time, the buffer write control 104 and buffer read control 108 may vary the number of video feeds being buffered based on power and/or energy considerations. The buffer write control 104 and buffer read control 108 may also vary the number of video feeds being buffered in order to provide a longer buffer history (i.e., a trade-off may be made between buffering a large number of video feeds for a relatively shorter amount of time and buffering a smaller number of video feeds for a relatively longer amount of time). In one embodiment, when the sound volume of a crowd of spectators at the live event exceeds a particular threshold, then the number of video feeds being buffered may be increased (i.e., the excitement level of the crowd may warrant the buffering of a larger number of video feeds at the expense of a higher power and energy consumption). In another embodiment, the number of video feeds being buffered may be increased when a live sporting event reaches a particular milestone (e.g., the two minute warning in football or the ninth inning in baseball).

Figure 3A:
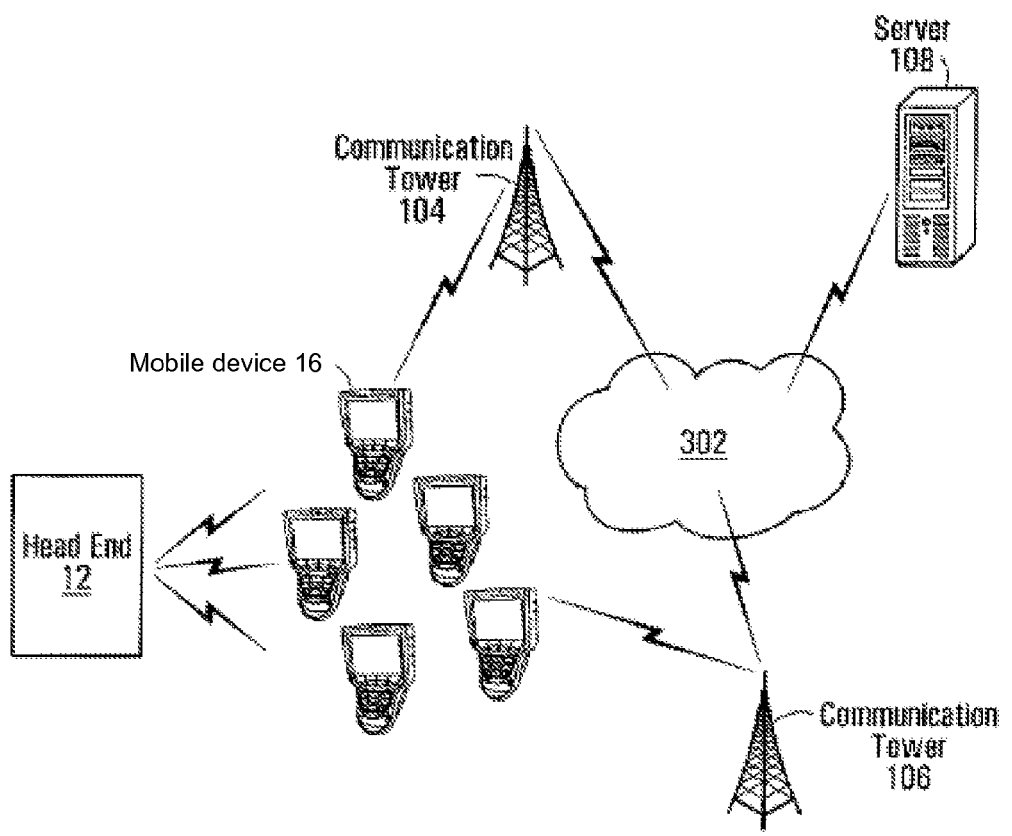
FIG. 3A depicts one embodiment of a bidirectional communication system for supporting one or more mobile devices.

FIG. 3A depicts one embodiment of a bidirectional communication system for supporting one or more mobile devices. Assume for the sake of this example that a set 100 of handheld devices including mobile device 16 are located at a live sporting event (e.g., a football game). The handheld devices all receive the wireless RF transmission from the head end 12 via a broadcast transmission (e.g., a UHF transmission) or via a cellular transmission. The handheld electronic devices can also communicate individually with the head end 12 via a cellular network. In this example, the cellular network has two cellular towers 104 and 106 located away from one another such as to provide adequate reception coverage from any of the handheld devices at the live sporting event. Each handheld device may be provided with the functionality allowing it to establish communication with a computer network, such as Internet network 302. Another possibility that can be used instead of a cellular network is a WiFi network or any other cellular type infrastructure allowing individual wireless communication to take place between each handheld device and a remote entity, such as server 108. In practice, the amount of information that needs to be sent from the individual handheld electronic devices is less than the amount of data carrying capacity of the wireless RF transmission from the head end 12.

Figure 3B:
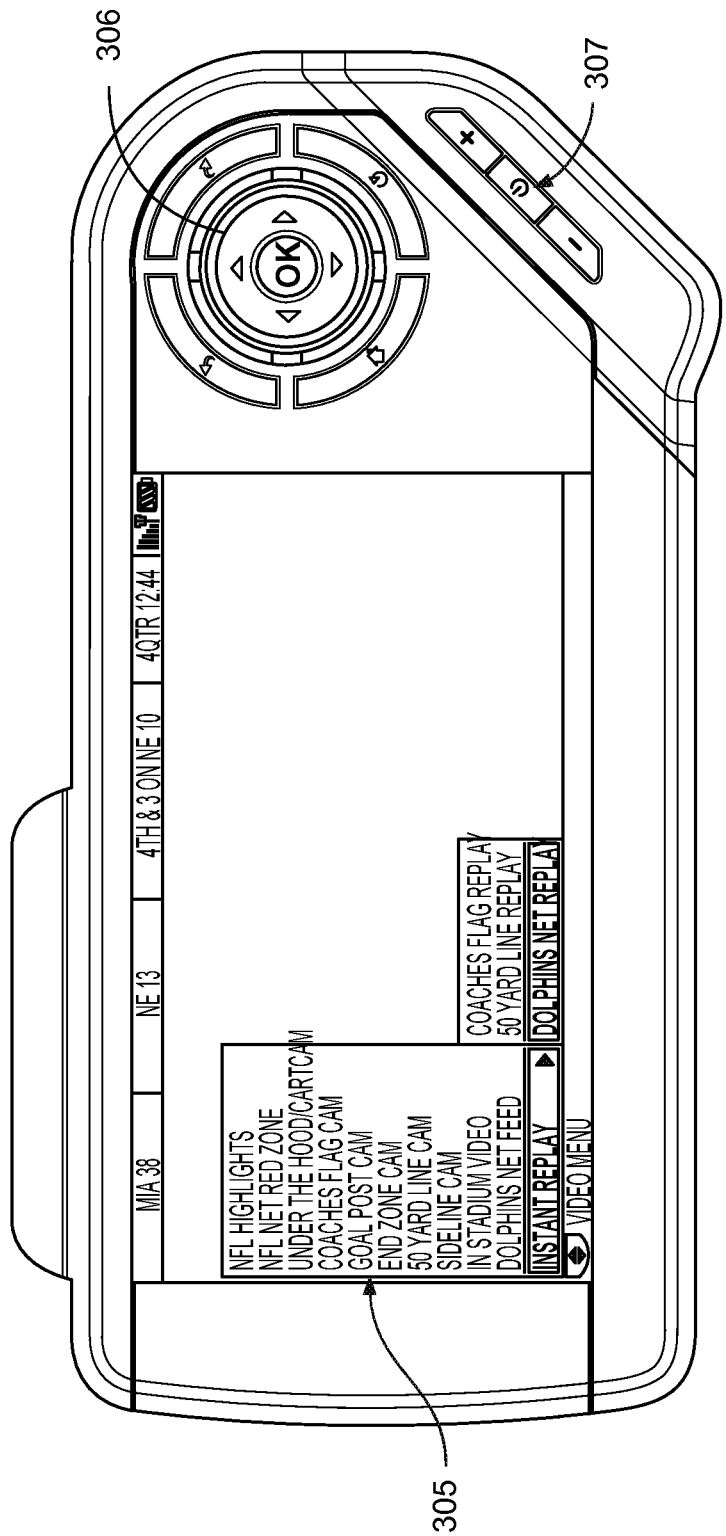
FIG. 3B depicts one embodiment of a mobile device.

FIG. 3B depicts one embodiment of a mobile device 16. As depicted, the mobile device 16 includes user input keys 306, which allow the user to control the playback of video on the display screen, access buffered audio/video/data, and provide other user input. The display screen is currently showing a menu 305 that allows the user to select different video steams for viewing. For example, a user at a football game could select to watch a video channel from an end-zone camera, a 50-yard line camera, a goal post camera, etc. User input keys 307 may be used to select which video channel from the menu to display, as well as other functions.

In some embodiments, the different video channels are buffered so that the user can replay the content of a video buffer. For example, the user input keys 306 may be used to rewind, fast forward, pause, play, and slow step through the content of the video buffer. In some embodiments, the video buffers store different camera angles of the same action. For example, at least some of the video buffers might include different camera angles associated with a replay challenge in a football game. Thus, the user can replay the different camera angles while the replay challenge is taking place to decide for themselves which team should win the challenge.

It should be noted that although a dedicated mobile device has been disclosed, the technology described herein may be implemented as an application running on a smart phone, tablet PC, or other mobile computing device. In some cases, a mobile computing device may be augmented with a wireless dongle to provide the ability to acquire wireless transmissions from a head end.

Figure 4:
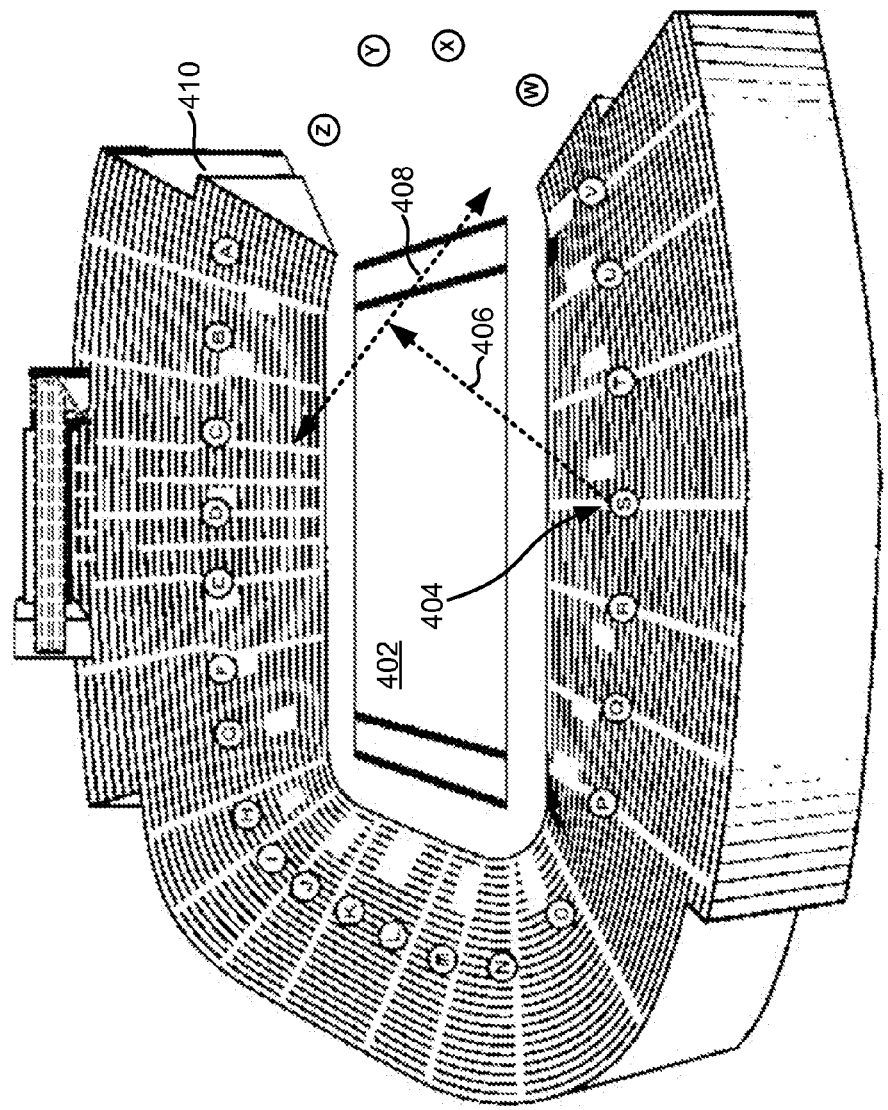
FIG. 4 depicts one embodiment of a map of a venue.

FIG. 4 depicts one embodiment of a map of a venue. As depicted, the map may comprise a three-dimensional model of the venue including a playing surface 402, spectator seating 410, and camera locations A-Z. Each of the camera locations A-Z may be associated with a feed vector that describes a direction or angle being captured by a particular camera. Each of the camera locations A-Z may also be associated with a field of view width, a field of view height, and/or one or more viewing angles, which along with the feed vector may be used to describe the field of view captured by a particular camera. In some cases, the location and/or viewing angle associated with a particular camera may vary over time, at which point an updated map of the venue may be transmitted to mobile devices at the venue.

As depicted, camera 404 at camera location S is associated with a feed vector 406 and a field of view width 408. A three-dimensional map may include a plurality of cameras and each camera of the plurality of cameras may be associated with a three-dimensional location relative to the three-dimensional map and a three-dimensional feed vector relative to the three-dimensional map. Locations for various landmarks, such as end zones, goal posts, yard lines, bullpens, dugouts, may also be provided. In some cases, the map of the venue may comprise a two-dimensional map.

Figure 5A:
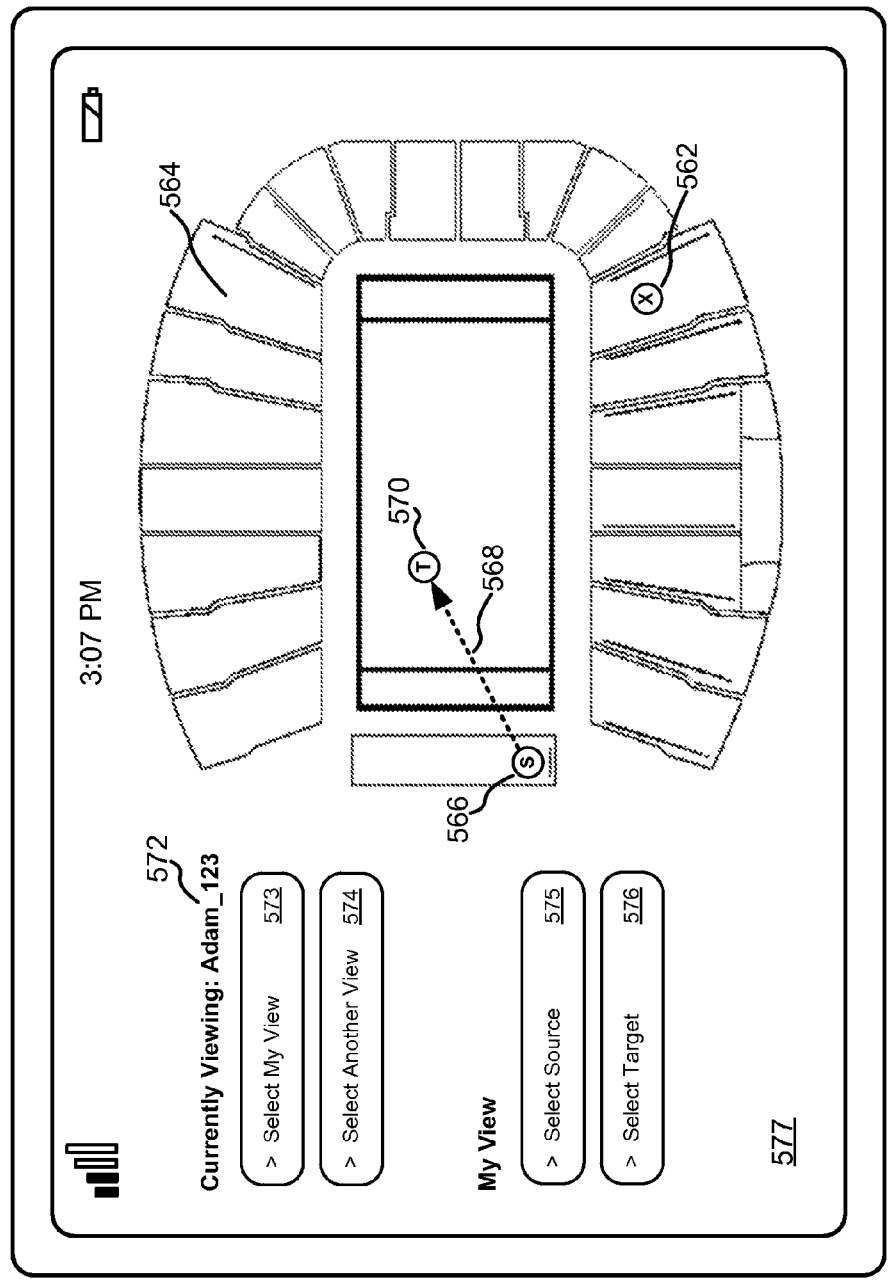
FIG. 5A depicts one embodiment of a mobile device.

FIG. 5A depicts one embodiment of a mobile device 16. As depicted, mobile device 16 comprises a mobile computing device and includes a touchscreen display 577. The touchscreen display 577 may include an LCD display for presenting a user interface to an end user of the mobile device 16. The touchscreen display 577 includes a status area 552 which provides information regarding signal strength, time, and battery life associated with the mobile device 16. As depicted, a two-dimensional map 564 of a venue is presented to the end user of mobile device 16. The two-dimensional map 564 includes a current location 562 of the mobile device 16 within the venue. The current location 562 may correspond with a GPS location of the mobile device 16. In some cases, the GPS location may be determined using a pseudolite-only system or a hybrid pseudolite-GPS system including one or more ground-based pseudo-satellite transceivers. The current location 562 of the mobile device 16 may also be determined using WiFi triangulation. In some cases, the current location 562 may be transmitted to a local server at the venue in order to enable various venue-related services (e.g., food or concierge services).

As depicted, the two-dimensional map 564 also includes a source point 566 and a target point 570. The source point 566 corresponds with a desired camera location and the target point 570 corresponds with a target location within the venue to be viewed from the desired camera location. The source point 566 and the target point 570 determine a requested vector 568. In one embodiment, the end user of mobile device 16 may specify the source point 566 and the target point 570 by touching the touchscreen display 577 at a first point corresponding with the source point and dragging their finger along the surface of the touchscreen display and stopping at a second point corresponding with the target point. In another embodiment, the source point 566 may default to the current location 562 of the mobile device 16 and the target point 570 may default to a location associated with a tracked object at the venue (e.g., a ball). In some embodiments, a first video feed associated with a first feed vector may be displayed on mobile device 16 if the first feed vector is the best match to the requested vector 568.

The end user of mobile device 16 may control the determination of a source point using a select source option 575. The source point may correspond with a particular camera at the venue. In one example, the source point may be determined by performing a physical gesture with mobile device 16. In another example, the source point may be determined using an audio command (e.g., an end user stating "select end zone camera" or "select left field camera"). The end user of mobile device 16 may control the determination of a target point using a select target option 576. The target point may correspond with a particular object in the live event such as a ball or player participating in the live event. In one example, the target point may be determined by performing a physical gesture with mobile device 16. In another example, the target point may be determined using an audio command (e.g., an end user stating "select ball" or "select end zone").

In some embodiments, the current location 562 may be used to identify labels associated with various landmarks within the venue (e.g., the left end zone or north end zone). The current location 562 may also be used to identify labels associated with various cameras at the venue (e.g., the north end zone camera). The current location 562 may also be used to configure directions from the current location 562 (e.g., directions to the closest restroom). The current location 562 may correspond with a three-dimensional point relative to a three-dimensional model of the venue. In some cases, a GPS location is used to provide a two-dimensional location within the venue and then a three-dimensional model of the venue may be used to infer a height coordinate relative to the three-dimensional model (i.e., assuming that a particular mobile device is located in a venue seating section). In many venues, the height coordinate may be inferred from the GPS location as there may only be a single spectator seat corresponding with the GPS location.

Figure 5B:
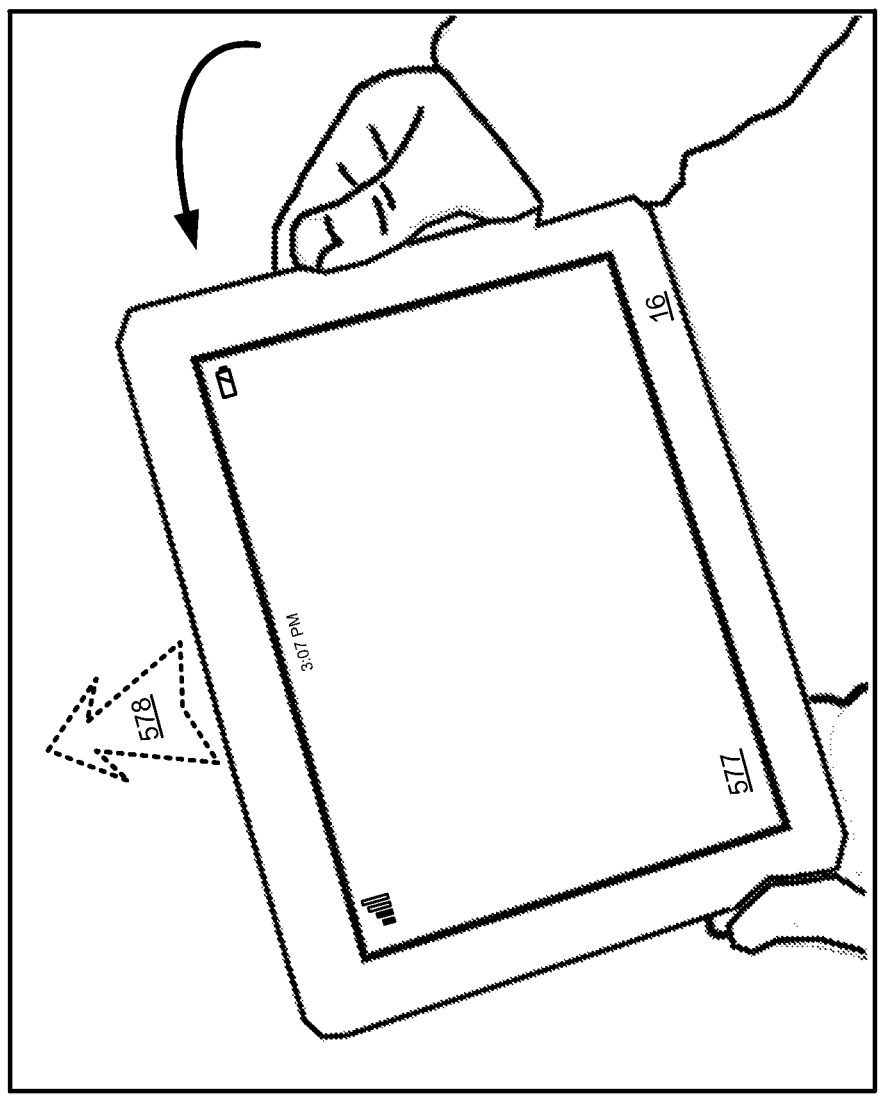
FIG. 5B depicts one embodiment of a physical gesture for determining a direction from a mobile device.

FIG. 5B depicts one embodiment of a physical gesture for determining a direction 578 from a mobile device 16. As depicted, a direction or direction vector may be determined by an end user holding mobile device 16 and performing a particular physical gesture such as flicking the mobile device 16 forward by particular amount. The direction vector may correspond with a three-dimensional vector relative to a map of the venue with a starting point corresponding with a GPS location of the mobile device 16 and a direction orthogonal to the surface of the mobile device 16 pointing away from the end user. Other physical gestures utilizing the mobile device 16 may also be used for determining a requested direction or for selecting a particular object within the venue. A particular object may include a camera, a player or actor contributing to the live event, or a landmark within the venue.

Referring to FIG. 5A, mobile device 16 may display a video feed determined by another computing device. As depicted, mobile device 16, when in display mode, will be controlled by a second computing device associated with a second end user 572 with an end user identifier of "Adam_123." The select another view option 574 allows an end user of mobile device 16 to determine a controlling (or master) computing device that will dictate the video feeds displayed on mobile device 16. The select my view option 573 allows an end user of mobile device 16 to control the video feeds displayed on mobile device 16 themselves.

Figure 5C:
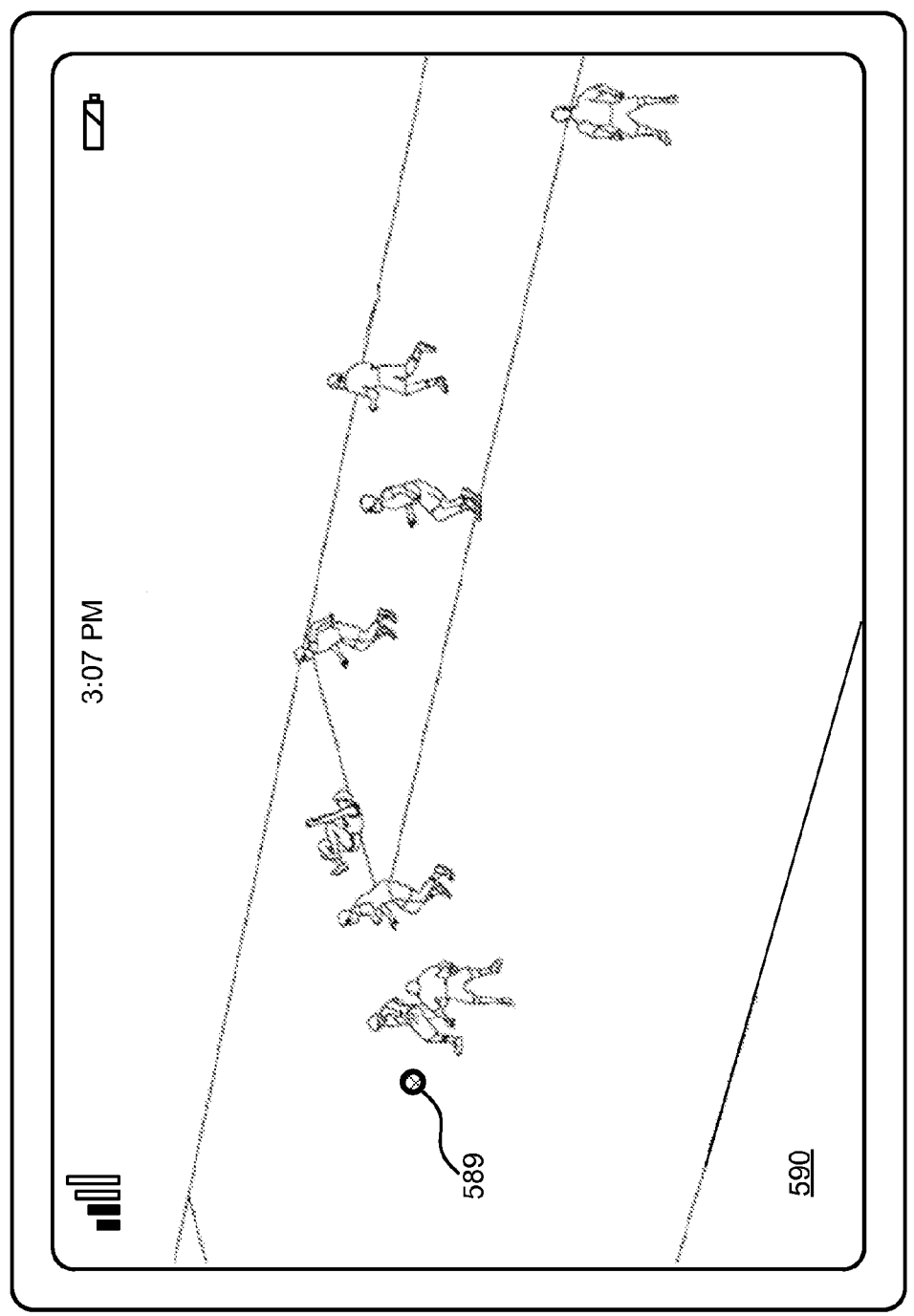
FIG. 5C depicts one embodiment of a mobile device displaying a first field of view.

FIG. 5C depicts one embodiment of a mobile device 16 displaying a first field of view 590. In some cases, an object within a field of view, such as ball 589, may be highlighted to enable easier viewing by an end user of the mobile device. The first field of view 590 may correspond with a live video feed of the live event or a replay.

Figure 5D:
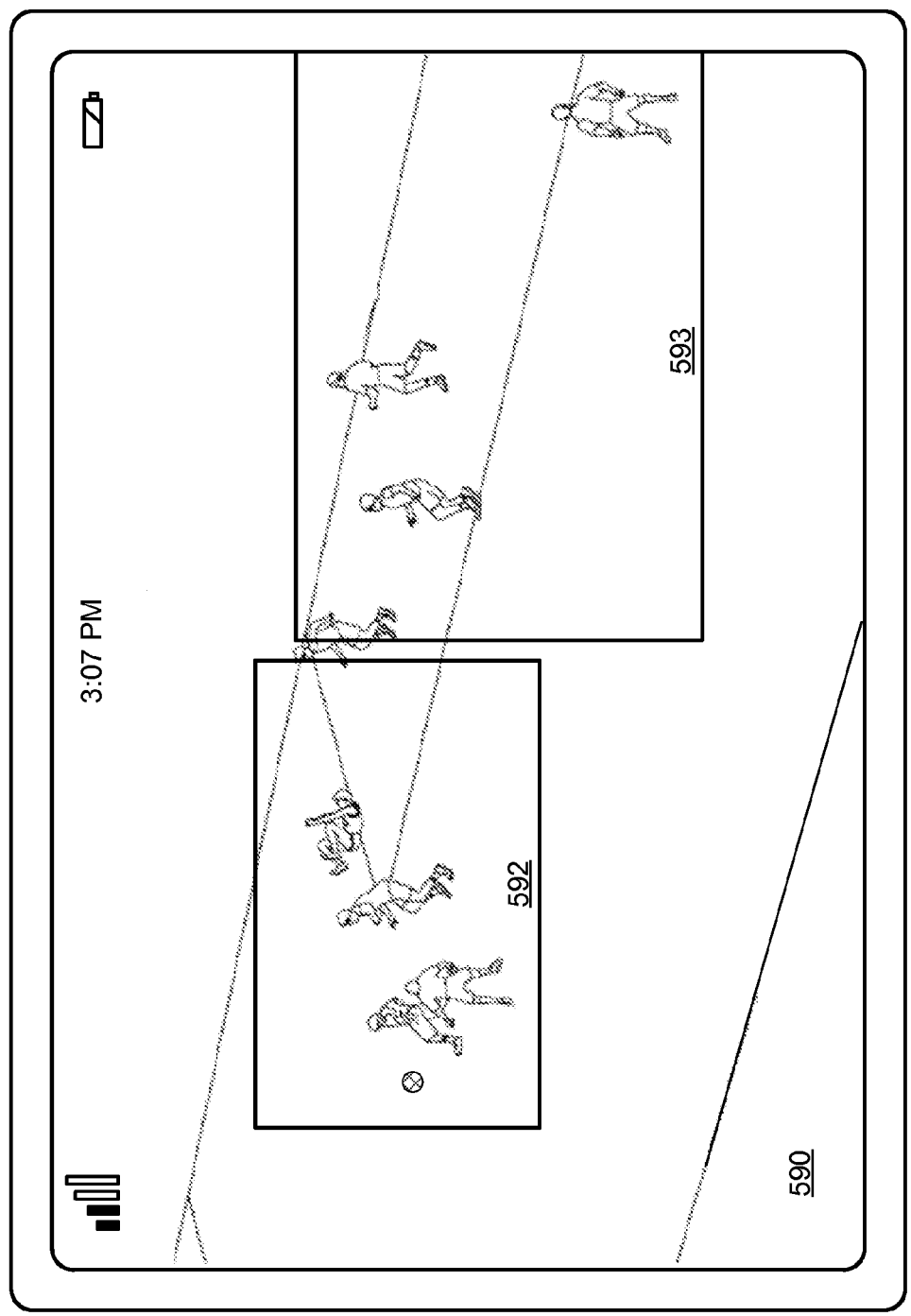
FIG. 5D depicts one embodiment of a mobile device displaying a first field of view.

FIG. 5D depicts one embodiment of a mobile device 16 displaying a first field of view 590. As depicted, a second field of view 592 corresponding with a second computing device (e.g., currently being displayed by the second computing device) and a third field of view 593 corresponding with a third computing device are highlighted. In one embodiment, an end user of mobile device 16 may select a different field of view using the touchscreen interface of mobile device 16. In one example, the end user may zoom-in or zoom-out by applying finger gestures to the touchscreen interface of mobile device 16. The end user may zoom-in or zoom-out with a live video feed or a buffered video feed associated with a replay.

Figure 5E:
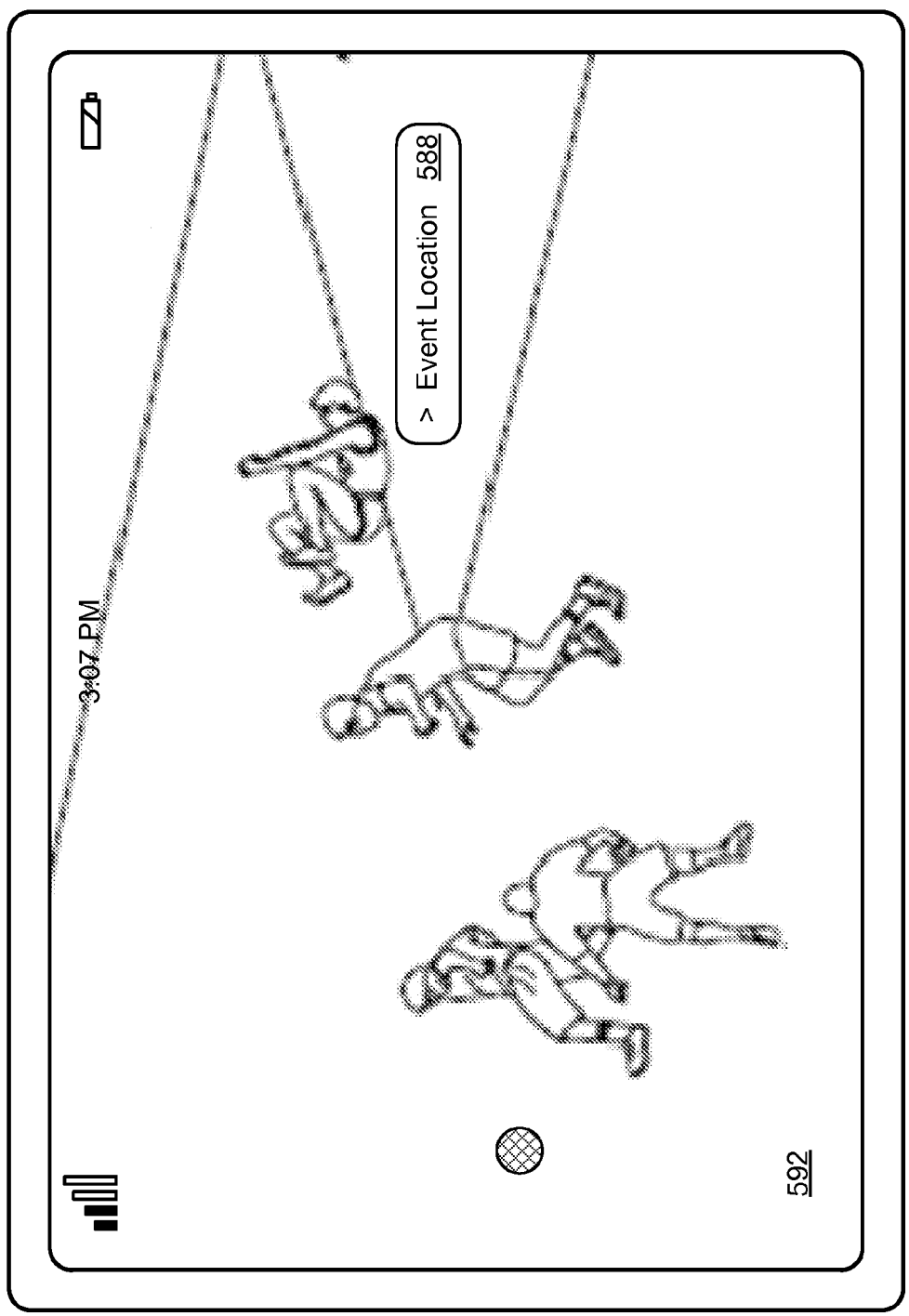
FIG. 5E depicts one embodiment of a mobile device displaying a second field of view.

FIG. 5E depicts one embodiment of a mobile device 16 displaying a second field of view 592. As depicted, the second field of view 592 corresponds with a region (or subset) of the first field of view 590. An event location marker 588 corresponding with a location within a venue associated with a particular event may be transmitted to mobile device 16 via a head end, such as head end 12 of FIG. 1, or via a second computing device wherein a second end user of the second computing device may place the location of the event location marker 588. In one embodiment, an event location marker may be selected as a target point within the venue.

Figure 5F:
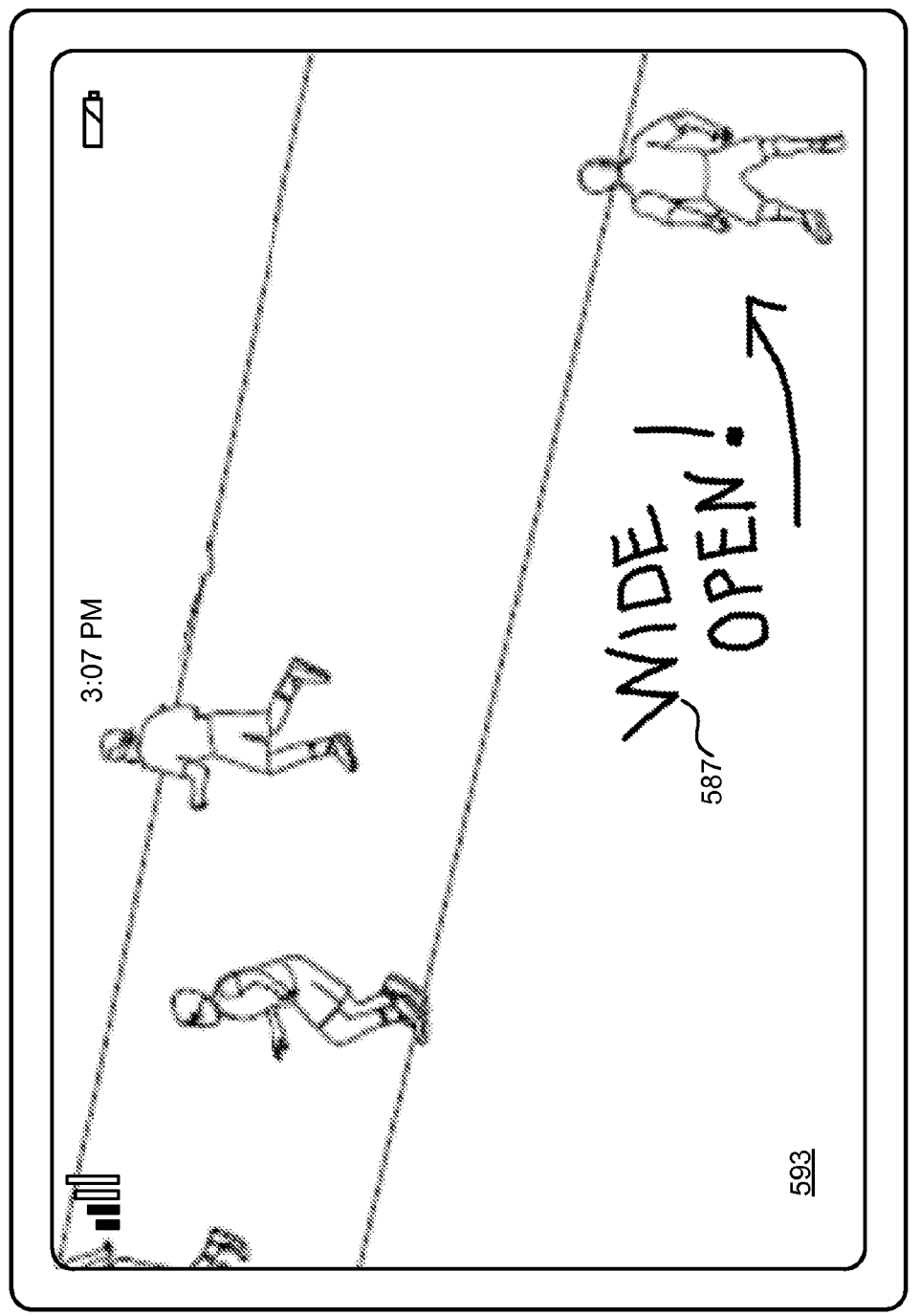
FIG. 5F depicts one embodiment of a mobile device displaying a third field of view.

FIG. 5F depicts one embodiment of a mobile device 16 displaying a third field of view 593. As depicted, the third field of view 593 corresponds with a region (or subset) of the first field of view 590. A shared comment 587 generated by a second end user (i.e., the comment "Wide Open!" with an arrow pointing to a particular player) may be transmitted to mobile device 16 and displayed. A shared comment may be bound to a particular location within the venue or to a particular video feed during a particular period of time. For example, during a replay after a penalty occurring at a live sporting event, the second end user may cause a shared comment to be displayed on mobile device 16 during a portion of the replay time period.

Figure 5G:
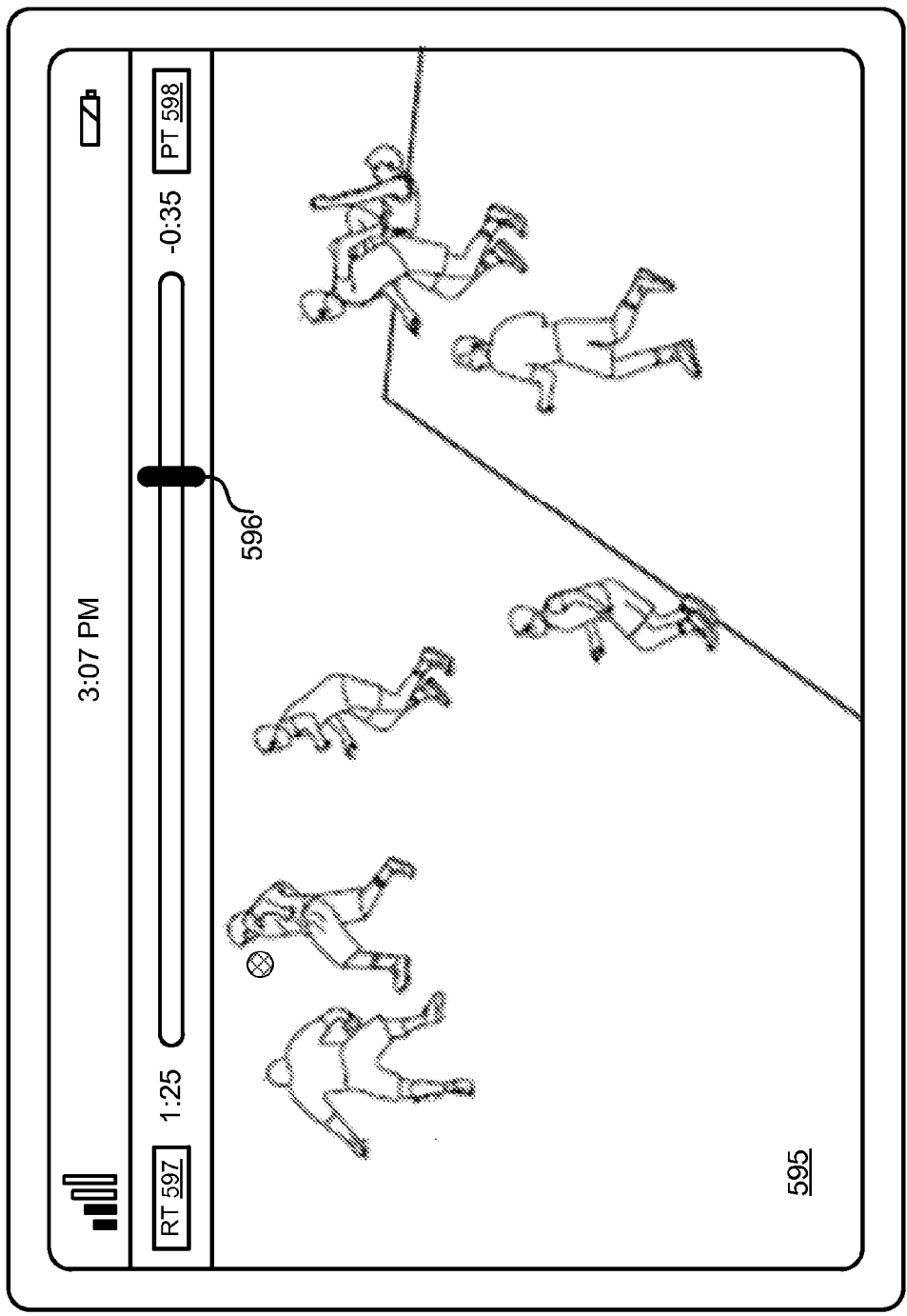
FIG. 5G depicts one embodiment of a mobile device displaying a fourth field of view.

FIG. 5G depicts one embodiment of a mobile device 16 displaying a fourth field of view 595. As depicted, the fourth field of view corresponds with a different viewpoint than the first field of view 590. In one embodiment, a replay may be automatically displayed to an end user of mobile device 16 after a replay triggering event. The replay triggering event may correspond with a break or pause in action occurring at the live event. In one example, the replay triggering event may be indicated via a replay flag transmitted from a head end, such as head end 12 and FIG. 1. In another example, the replay triggering event may be determined based on a game clock being stopped or started. In another example, the replay triggering event may comprise the sound of a particular sound (e.g., the sound of a whistle).

As depicted, a replay corresponding with a replay time period of two minutes (i.e., 1:25+0:35) is displayed on mobile device 16. An end user of mobile device 16 may adjust a time associated with the replay time period using time adjustment bar 596. The end user may end the replay and view a live video feed by selecting the present time option 598. The end user may force a predetermined replay time period (e.g., a 30 second time period) by selecting the replay time option 597. In one embodiment, at any point in time the end user of mobile device 16 may zoom-in or zoom-out a particular video feed being displayed on the mobile device 16.

Figure 5H:
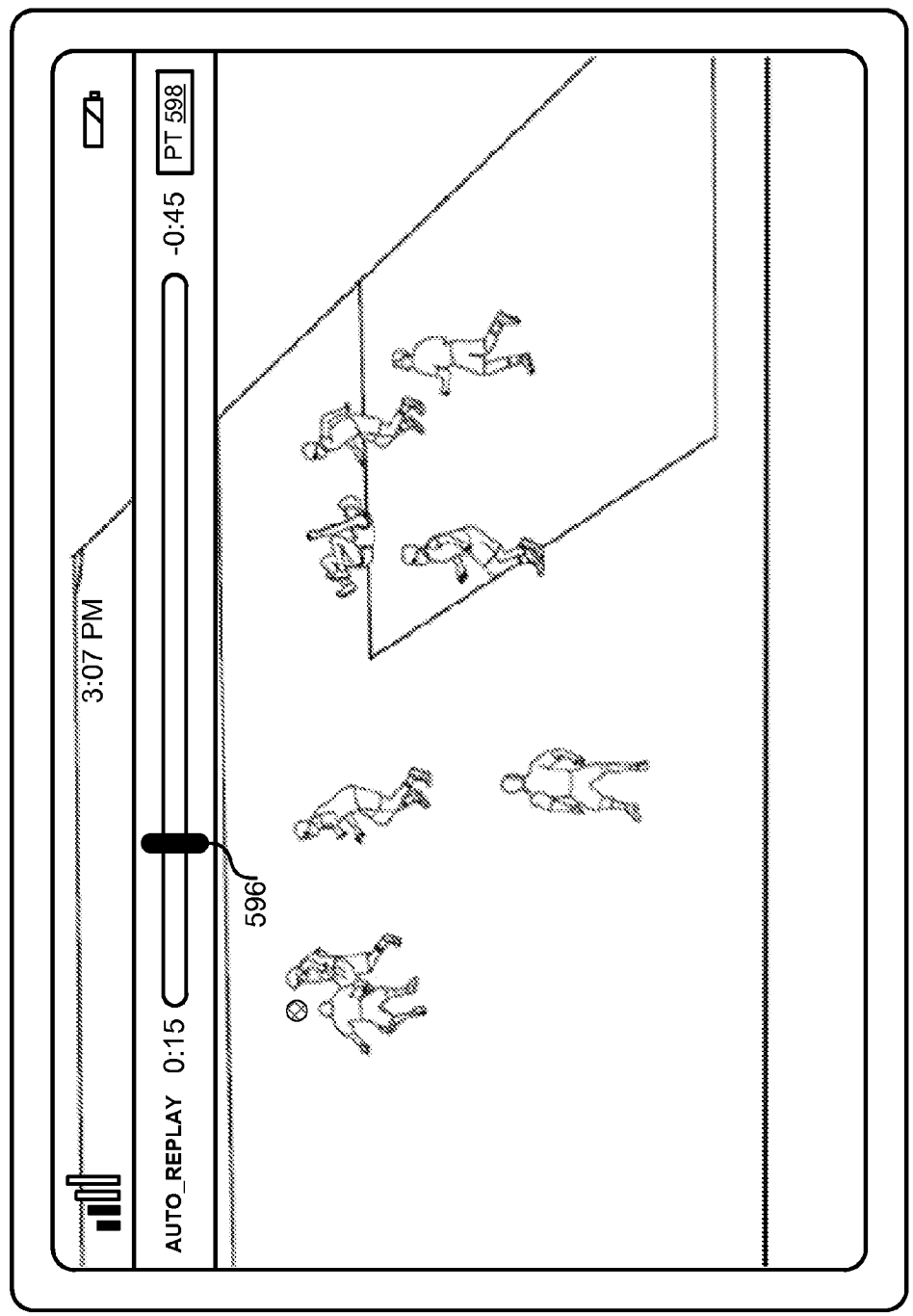
FIG. 5H depicts one embodiment of a mobile device displaying a replay determined by one or more other computing devices.

FIG. 5H depicts one embodiment of a mobile device 16 displaying a replay determined by one or more other computing devices. In one embodiment, the one or more other computing devices comprise a second computing device that may act as a controlling (or master) computing device for determining the replay sequences displayed on mobile device 16. In another embodiment, the replay sequence may be determined based on the viewing preferences associated with a plurality of other computing devices (e.g., the replay sequence may comprise a sequence of video feeds based on a majority vote of the video feeds viewed by the plurality of other computing devices). The replay sequence may be determined locally on mobile device 16 or by a server in communication with the plurality of other computing devices and transmitted to mobile device 16. If the automatic replay allows for the replay to not be synchronized with the plurality of other computing devices, then an end user of mobile device 16 may adjust a time associated with the replay time period using time adjustment bar 596.

Figure 6A:
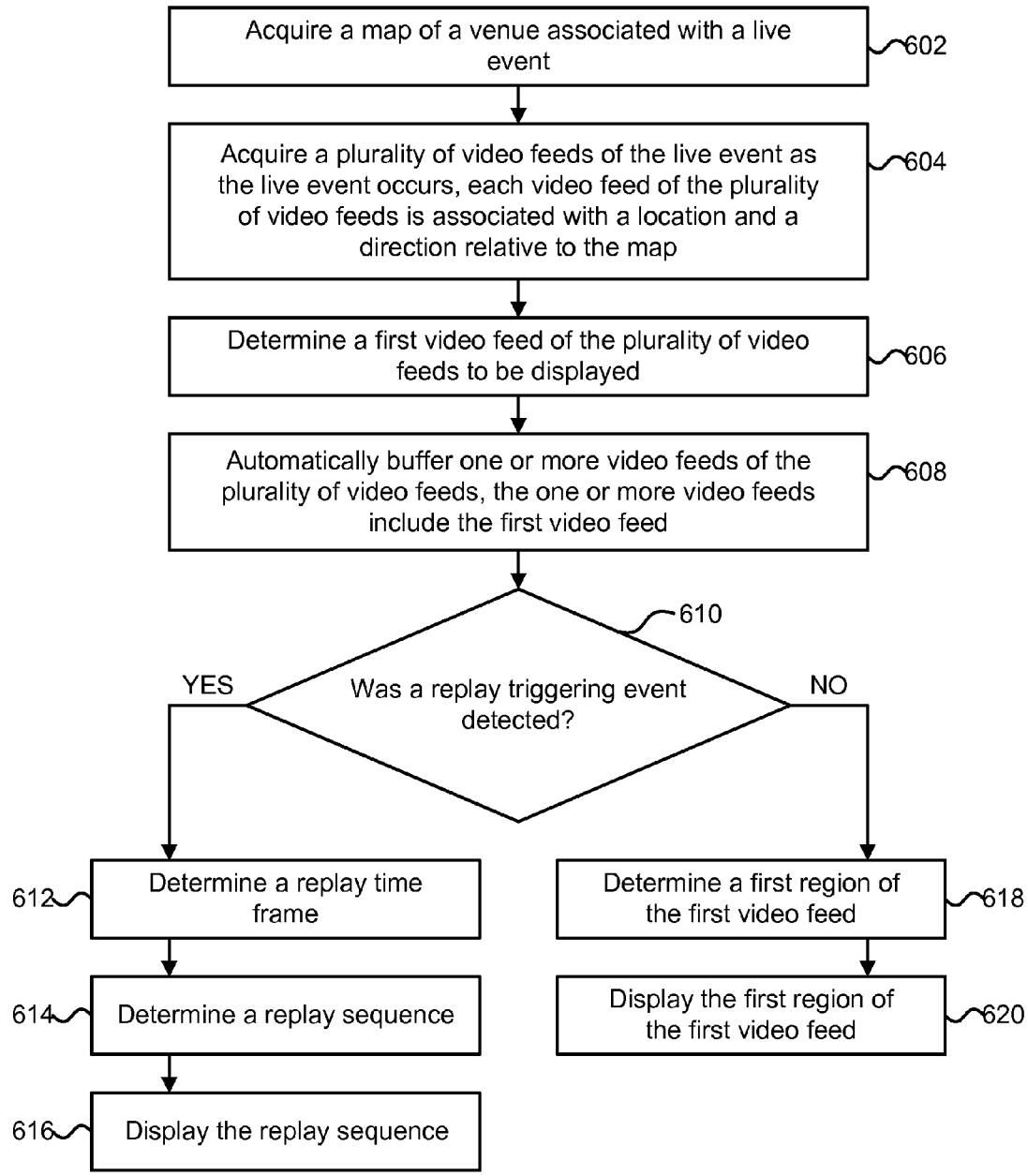
FIG. 6A is a flowchart describing one embodiment of a process for automatically selecting and displaying video feeds associated with a live event.

FIG. 6A is a flowchart describing one embodiment of a process for automatically selecting and displaying video feeds associated with a live event. In one embodiment, the process of FIG. 6A is performed by a mobile device, such as mobile device 16 in FIG. 1.

In step 602, a map of a venue associated with a live event is acquired. The map may be acquired from a transmission broadcast periodically from a head end, such as head end 12 in FIG. 1. The map may comprise a three-dimensional model of the venue. In step 604, a plurality of video feeds of the live event is acquired as the live event occurs. Each video feed of the plurality of video feeds may be associated with a particular camera (per a camera identifier), a particular location of the particular camera relative to the map, and a feed vector that describes a direction or angle being captured by the particular camera relative to the map.

In step 606, a first video feed of the plurality of video feeds to be displayed is determined. The first video feed may correspond with the video feed of the plurality of video feeds that best approximates (or fits) a requested viewing vector as requested by an end user of a mobile device, such as mobile device 16 of FIG. 1. The end user may specify the requested viewing vector using a touchscreen interface on the mobile device. One embodiment of a process for determining a first video feed is described later in reference to FIG. 6B.

In step 608, one or more video feeds of the plurality of video feeds are automatically buffered. The one or more video feeds may include the first video feed determined in step 606. The one or more video feeds may comprise a subset of the plurality of video feeds. In one embodiment, the one or more video feeds may be determined based on the viewing behavior of an end user of a mobile device and/or the viewing behaviors of a group of other end users using other mobile devices at the live event. In another embodiment, the one or more video feeds may be determined based on complementary feed vectors. In one example, the complementary feed vectors may correspond with cameras at a venue that provide a different angle to a target point within the venue (e.g., cameras corresponding with or best matching a 90 degree angle, 180 angle, and 270 angle from a camera angle currently viewed on a mobile device). One embodiment of a process for automatically buffering one or more video feeds is described later in reference to FIG. 6C.

In some cases, the one or more video feeds of the plurality of video feeds may be automatically buffered while a mobile device is displaying a replay of a buffered video feed. More information about buffering video feeds can be found in U.S. Pat. No. 8,042,140, entitled "Buffering Content on a Handheld Electronic Device," issued Oct. 18, 2011, which is herein incorporated by reference in its entirety.

In step 610, it is determined whether a replay triggering event has been detected. If a replay triggering event has been detected, then step 612 is performed. Otherwise, if a replay triggering event is not detected, then step 618 is performed. In one embodiment, a replay triggering event may be detected by a mobile device and in response a replay may be displayed on the mobile device. The replay triggering event may correspond with a break or pause in action occurring at the live event (e.g., after the end of a play in football or after an out in baseball). In one example, the replay triggering event may be indicated via a replay flag transmitted from a head end, such as head end 12 and FIG. 1. In another example, the replay triggering event may be determined based on a game clock being stopped or started. In some cases, the game clock may be transmitted to a mobile device via the head end. In another example, the replay triggering event may comprise the sound of a particular sound (e.g., the sound of a whistle). The replay trigger event may cause a replay sequence to be displayed on a mobile device automatically without intervention (e.g., a replay request) by an end user of the mobile device.

In some embodiments, the replay triggering event may be used to automatically push a replay from an out-of-town game. The replay from the out-of-town game may be determined based on user preferences associated with an end user of a mobile device and/or user preferences associated with a group of end users at the live event. In one example, a user preference may specify a preference for a favorite team and the replay from the out-of-town game may involve members of the favorite team. In some cases, user preferences may be inferred based on web searches performed by end users at the live event.

In step 612, a replay time frame is determined. The replay time frame may be preset to a predetermined time (e.g., 30 seconds prior to the replay triggering event). The replay time frame may depend upon the replay triggering event detected. For example, the replay time frame for a replay corresponding with the end of a play in football may be 30 seconds, while the replay time frame for a replay corresponding with the end of a quarter in football may be 1 minute. In some embodiments, the replay time frame may be determined by a second computing device in communication with the mobile device used by the end user.

In step 614, a replay sequence is determined. The replay sequence may comprise a particular sequence of buffered video feeds. Each of the video feeds in the particular sequence may be identified via a video feed identifier and correspond with a particular time period within the replay time frame. For example, the replay time frame may comprise a 30 second time window prior to a current time and the replay sequence may comprise a first video feed associated with the first 15 seconds of the 30 second time window and a second video feed associated with the last 15 seconds of the 30 second time window.

In some embodiments, the particular sequence and a corresponding playback rate may be determined based on the viewing behavior of the end user of the mobile device and/or the viewing behaviors of a group of other end users using other mobile devices at the live event. One embodiment of a process for determining a replay sequence is described later in reference to FIG. 6D.

In step 616, the replay sequence is displayed. The replay sequence may be displayed on a display of a mobile device, such as mobile device 16 in FIG. 1. The replay sequence may be displayed at a particular playback rate (or replay rate). The particular playback rate may depend on the type of replay triggering event and/or the type of live event (e.g., a replay associated with a hockey game with a fast-moving hockey puck may require a slower replay rate than a replay associated with a golf tournament). In some embodiments, the replay sequence may comprise a shared replay sequence in which a plurality of mobile devices associated with end users attending the live event may interact with each other while sharing the replay sequence. In some cases, a controlling mobile device (or master device) of the plurality of mobile devices may provide the replay time frame, the replay sequence, and a synchronization signal for beginning the display of the replay sequence. One embodiment of a process for displaying a replay sequence is described later in reference to FIG. 6E.

In step 618, a first region of the first video feed is determined. The first region may correspond with a zoomed-in region of the first video feed. The first region may be determined by an end user of a mobile device via one or more finger gestures applied to a touchscreen interface of the mobile device. In step 620, the first region of the first video feed is displayed. The first region of the first video feed may be displayed on a display of a mobile device, such as mobile device 16 and FIG. 1. The first video feed may comprise a real-time or live video feed of a live event.

Figure 6B:
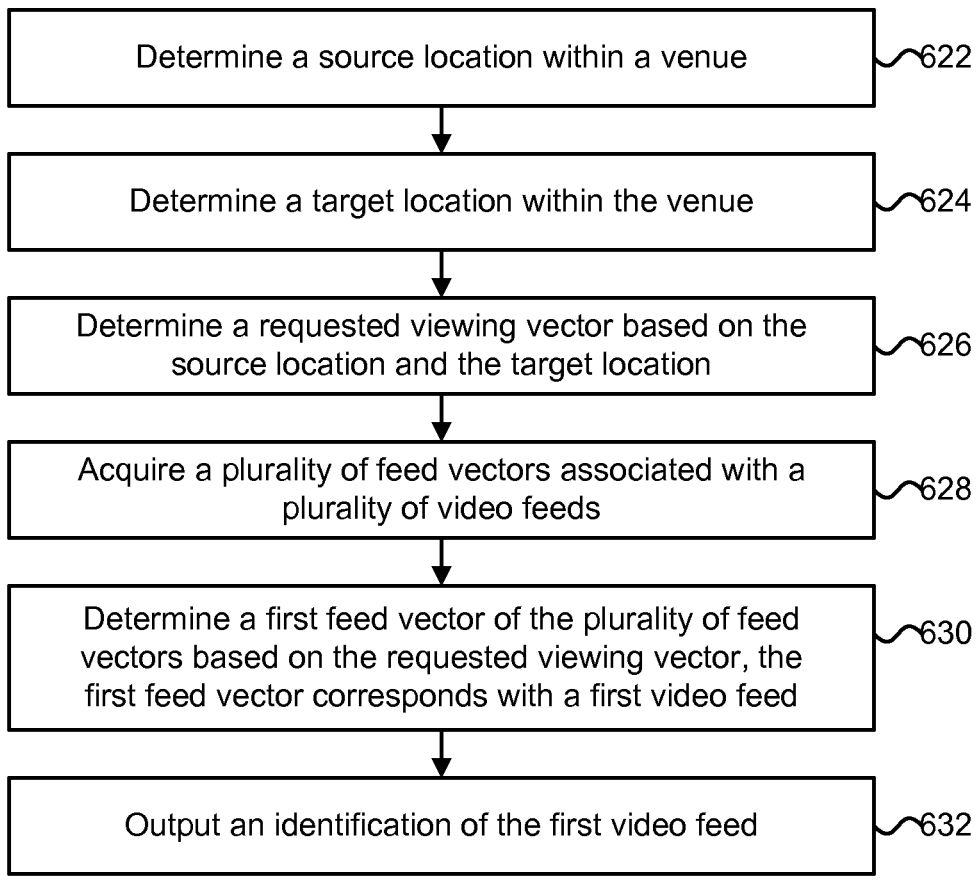
FIG. 6B is a flowchart describing one embodiment of a process for determining a first video feed of a plurality of video feeds to be displayed on a mobile device.

FIG. 6B is a flowchart describing one embodiment of a process for determining a first video feed of a plurality of video feeds to be displayed on a mobile device. The process described in FIG. 6B is one example of a process for implementing step 606 in FIG. 6A. In one embodiment, the process of FIG. 6B is performed by a mobile device, such as mobile device 16 in FIG. 1.

In step 622, a source location within a venue is determined. The source location may correspond with a location of a desired camera location or viewpoint. In one embodiment, the source location may be determined from a GPS location associated with a mobile device within the venue. In another embodiment, an end user of a mobile device within the venue may select the source location (or target location) using a user interface of the mobile device. In another embodiment, an end user of the mobile device may take a picture of where they are sitting at the venue and the source location may be estimated using image recognition techniques.

In step 624, a target location within the venue is determined. The target location may correspond with a location within the venue to be viewed from the desired camera location or viewpoint. In some embodiments, the target location may correspond with a particular object within the venue, such as a particular player participating in a live event at the venue, a ball, or a hockey puck. The target location may correspond with a particular region within the venue, such as an end zone for a football game, an infield for a baseball game, or a particular green for a golf tournament. In some embodiments, a venue hosting a live event may be partitioned into a plurality of target regions (e.g., a football field may be partitioned into four regions, each region corresponding with a quarter of the football field) and the target location may be used to determine a particular target region within the venue that includes the target location.

In some cases, the target location (or target region including the target location) may be determined based on the viewing behavior of a group of end users using one or more group devices at a live event. For example, the target region may correspond with a particular region within the venue (e.g., an end zone or a first quarter of a field) that is viewed by the largest number of end users of the group of end users at a particular time during the live event.

In step 626, a requested viewing vector is determined based on the source location and the target location. The requested viewing vector may be anchored at the source location and have a vector direction directed towards the target location from the source location. In step 628, a plurality of feed vectors associated with a plurality of video feeds is acquired. The plurality of video feeds may be transmitted via a head end, such as head end 12 in FIG. 1. Each video feed of the plurality of video feeds may be associated with a particular feed vector. Each feed vector may comprise a camera location and a camera direction (or viewing direction). In some embodiments, each video feed of the plurality of video feeds may be associated with a field of view width, a field of view height, and/or one or more viewing angles, which along with a feed vector may be used to describe the field of view captured by a particular camera at the venue.

In step 630, a first feed vector of the plurality of feed vectors is determined based on the requested viewing vector determined in step 626. The first feed vector may correspond with a first video feed of the plurality of video feeds. In some embodiments, the first feed vector may correspond with the feed vector of the plurality of feed vectors that best approximates or most closely matches the requested viewing vector. In one embodiment, a first set of feed vectors of the plurality of feed vectors is determined based on a target region around the target location determined in step 624. In one example, each feed vector of the plurality of feed vectors that projects through the target region may be placed into the first set of feed vectors. The first feed vector may then correspond with the feed vector of the first set of feed vectors that minimizes an error angle with respect to the requested viewing vector. In step 632, an identification of the first video feed is outputted.

Figure 6C:
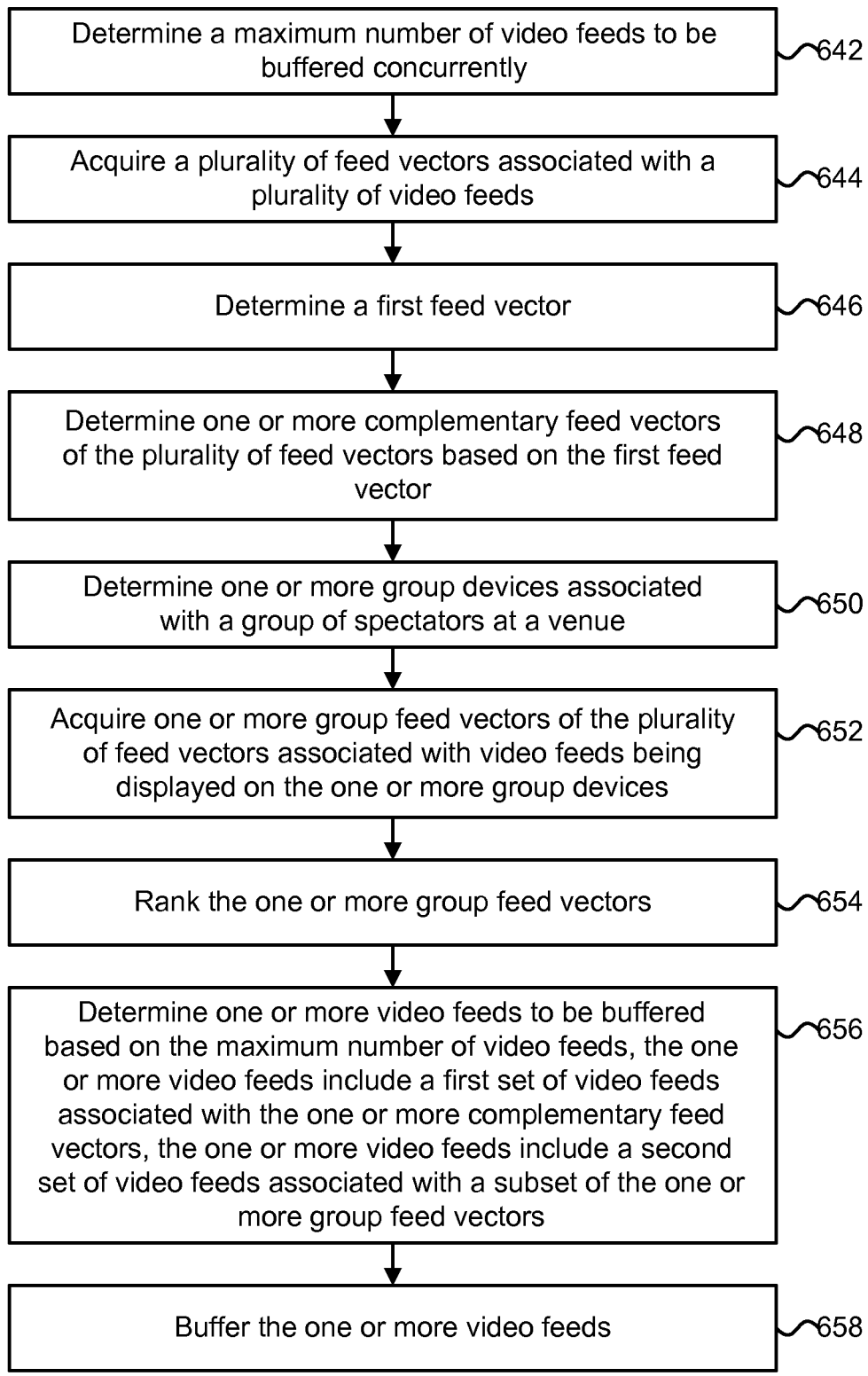
FIG. 6C is a flowchart describing one embodiment of a process for automatically buffering one or more video feeds.

FIG. 6C is a flowchart describing one embodiment of a process for automatically buffering one or more video feeds. The process described in FIG. 6C is one example of a process for implementing step 608 in FIG. 6A. In one embodiment, the process of FIG. 6C is performed by a mobile device, such as mobile device 16 in FIG. 1.

In step 642, a maximum number of video feeds to be buffered concurrently is determined. The maximum number of video feeds to be buffered concurrently may depend upon energy, power, and/or storage constraints placed on a mobile device. The maximum number of video feeds to be buffered concurrently may vary over time based on a context associated with a live event. In one example, when the sound volume of a crowd of spectators at the live event exceeds a particular threshold, then the maximum number of video feeds may be increased (i.e., the excitement level of the crowd may warrant the buffering of a larger number of video feeds at the expense of a higher power and energy consumption). In another example, the maximum number of video feeds may be increased when a live sporting event reaches a particular milestone (e.g., the two minute warning in football or the ninth inning in baseball). In another example, the maximum number of video feeds to be buffered may be increased when a tracked object (e.g., a football) is located within a particular region of a venue (e.g., the last 20 yards before an end zone and the end zone). The maximum number of video feeds to be buffered concurrently may be set locally on a mobile device or set via a time adjustable flag sent via a head end, such as head end 12 in FIG. 1.

In step 644, a plurality of feed vectors associated with a plurality of video feeds is acquired. The plurality of feed vectors may be transmitted via a head end, such as head end 12 in FIG. 1. Each feed vector of the plurality of feed vectors may correspond with a camera location and a camera direction (or viewing direction). In some embodiments, additional field of view information associated with each feed vector, such as a field of view width, a field of view height, and/or one or more viewing angles, may be acquired along with the plurality of feed vectors. The additional field of view information may provide a better estimate of the field of view captured by a particular camera at the venue.

In step 646, a first feed vector is determined. The first feed vector may be associated with a first video feed of the plurality of video feeds being displayed on a mobile device.

In step 648, one or more complementary feed vectors of the plurality of feed vectors are determined based on the first feed vector. In one embodiment, the one or more complementary feed vectors may correspond with other cameras at a venue that provide a different angle or different field of view direction to a target point (or target region) within the venue. In one example, the one or more complementary feed vectors include a reverse feed vector corresponding with a field of view that is 180 degrees relative to the first feed vector. The one or more complementary feed vectors may also include vectors corresponding with a field of views that are perpendicular to the first feed vector (e.g., feed vectors that are 90 degrees and/or 270 degrees relative to the first feed vector).

In step 650, one or more group devices associated with a group of spectators at a venue are determined. In one embodiment, the one or more group devices may include a number of mobile computing devices within a particular area of the venue. For example, the one or more group devices may comprise mobile devices within a particular seating section at the venue.

In one embodiment, the one or more group devices may be determined based on various characteristics of the one or more end users of the one or more group devices. The various characteristics may include a physical location associated with each of the group members (e.g., each of the group members may be located within a particular seating section of the venue), one or more common interests (as provided in user profiles associated with each of the group members), and/or a degree of closeness associated with a social graph or social networking graph. In some embodiments, the social graph may be associated with a particular social networking service such as Facebook, LinkedIn, or Twitter.

In step 652, one or more group feed vectors of the plurality of feed vectors associated with video feeds being displayed on the one or more group devices are acquired. In one embodiment, at a particular point in time (or at predefined time intervals), each mobile device of the one or more group devices may transmit a video feed identification associated with a video feed being displayed on the mobile device at the particular point in time. The video feed identification may be used to identify a feed vector using a video feed identification to feed vector mapping table acquired from a head end or a map of the venue acquired from a head end including camera location and direction information.

In step 654, the one or more group feed vectors are ranked. In one embodiment, the one or more group feed vectors are ranked according to popularity of each of the one or more group feed vectors. In one example, the one or more group feed vectors are ranked based on the frequency of displaying by the one or more group devices within a particular period of time. In some embodiments, end user preferences (e.g., specified in a user profile) may also be taken into account when ranking the one or more group feed vectors. In one example, an end user preference may include a preference (or weighting) for end zone camera angles. In step 656, one or more video feeds to be buffered are determined based on the maximum number of video feeds to be buffered. In one embodiment, the one or more video feeds to be buffered may correspond with the highest ranking feed vectors of the one or more group feed vectors (e.g., the top 15 feed vectors of the one or more group feed vectors).

In some embodiments, the one or more video feeds may include a first set of video feeds associated with the one or more complementary feed vectors determined in step 648 and a second set of video feeds associated with a subset of the one or more group feed vectors acquired in step 652. Thus, the one or more video feeds to be buffered may be determined based on the viewing behavior of an end user of a mobile device and/or the viewing behaviors of a group of other end users using other mobile devices at the live event. In step 658, the one or more video feeds to be buffered are buffered. The one or more video feeds may be concurrently buffered on a mobile device, such as mobile device 16 in FIG. 1. In some cases, along with each video feed buffered on the mobile device, a video feed identifier and timing information corresponding with the video feed may be buffered.

Figure 6D:
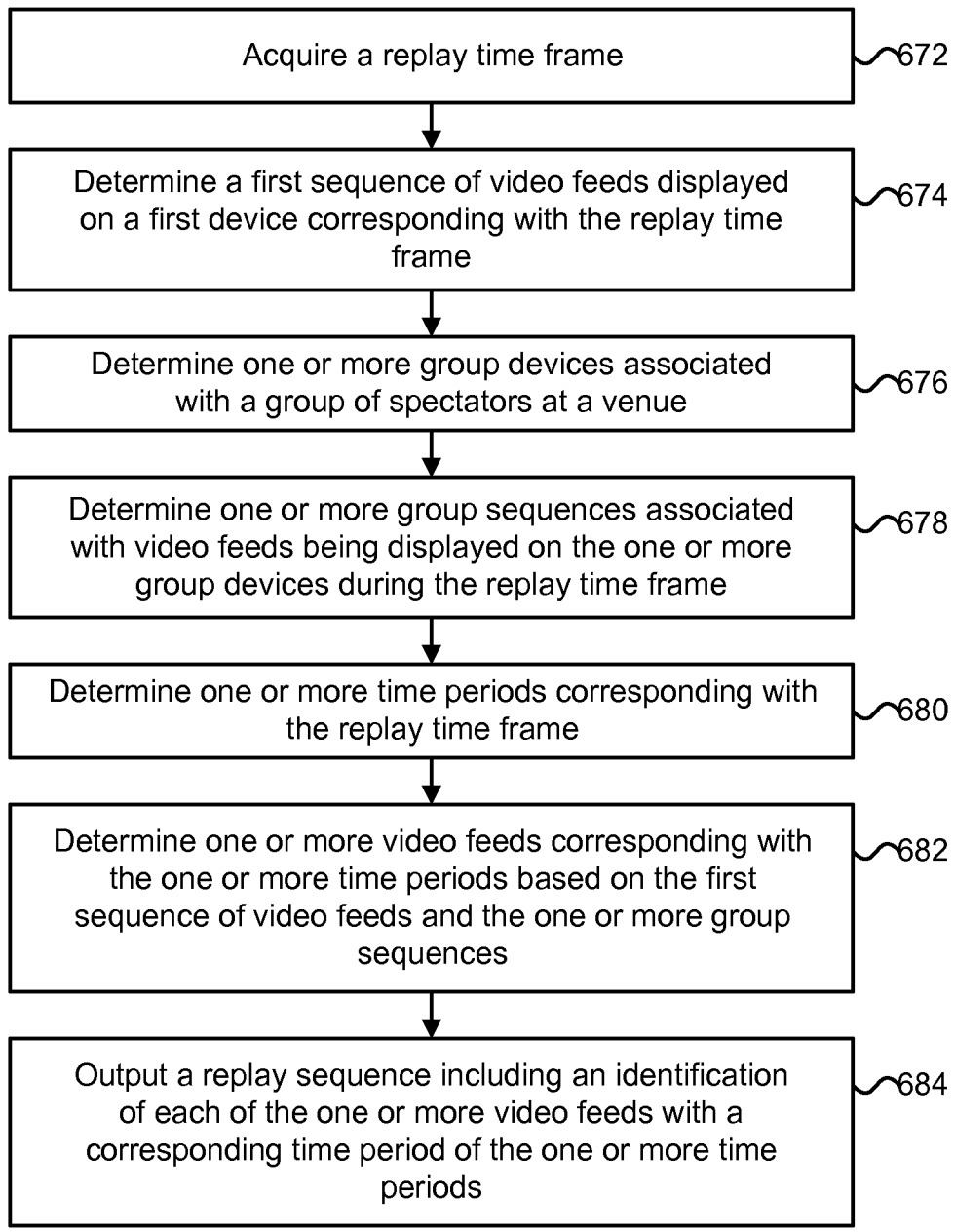
FIG. 6D is a flowchart describing one embodiment of a process for determining a replay sequence.

FIG. 6D is a flowchart describing one embodiment of a process for determining a replay sequence. The process described in FIG. 6D is one example of a process for implementing step 614 in FIG. 6A. In one embodiment, the process of FIG. 6D is performed by a mobile device, such as mobile device 16 in FIG. 1.

In step 672, a replay time frame is acquired. The replay time frame may be acquired from a head end, such as head end 12 in FIG. 1, or from a second mobile device located within a venue. In some cases, the replay time frame may be preset to a predetermined time (e.g., 30 seconds prior to the replay triggering event). The replay time frame may depend upon a replay triggering event detected. For example, the replay time frame for a replay corresponding with the end of a play in football may be 30 seconds, while the replay time frame for a replay corresponding with the end of a quarter in football may be 1 minute.

In step 674, a first sequence of video feeds displayed on a first device corresponding with the replay time frame is determined. The first device may correspond with a mobile device used by an end user at the venue and the first sequence of video feeds may correspond with the sequence of video feeds that were viewed by the end user during the replay time frame.

In step 676, one or more group devices associated with a group of spectators at a venue are determined. In one embodiment, the one or more group devices may include a number of mobile computing devices within a particular area of the venue. For example, the one or more group devices may comprise a group of mobile device within a particular seating section at the venue.

In one embodiment, the one or more group devices may be determined based on various characteristics of the one or more end users of the one or more group devices. The various characteristics may include a physical location associated with each of the group members (e.g., each of the group members may be located within a particular seating section of the venue), one or more common interests (as provided in user profiles associated with each of the group members), and/or a degree of closeness associated with a social graph or social networking graph. In some embodiments, the social graph may be associated with a particular social networking service such as Facebook, LinkedIn, or Twitter.

In some embodiments, the one or more common interests may be inferred based on demographic information including the gender and age of each of the group members. The one or more common interests may also include an affinity for a particular team (e.g., a football team) or various sporting events (e.g., football playoffs or baseball spring training) as specified in user profiles associated with each of the group members.

In step 678, one or more group sequences associated with video feeds being displayed on the one or more group devices during the replay time frame are determined. The one or more group sequences may correspond with the sequences of video feeds that were viewed by end users of the one or more group devices during the replay time frame. In step 680, one or more time periods corresponding with the replay time frame are determined. In one embodiment, the replay time frame may be segmented into a predetermined number of time periods. The segmentation of the replay time frame may be used to filter a sequence of video feeds and to provide a smooth transition from a first video feed of the sequence of video feeds to a second video feed of the sequence of video feeds. In one example, the replay time frame may be segmented or divided into 15 seconds time periods. In another embodiment, rather than segmenting the replay time frame into one or more time periods, a moving average may be used to filter a sequence of video feeds to be displayed during a replay.

In step 682, one or more video feeds corresponding with the one or more time periods are determined based on the first sequence of video feeds determined in step 674 and the one or more group sequences determined in step 678. Thus, the one or more video feeds associated with a replay sequence may be determined based on the viewing behavior of an end user of a mobile device and/or the viewing behaviors of a group of other end users using other mobile devices at the venue.

In one embodiment, each video feed of the one or more video feeds may correspond with a different time period of the one or more time periods. Each video feed of the one or more video feeds may correspond with the video feed that was most frequently displayed during its corresponding time period. In some embodiments, each video feed of the one or more video feeds may be determined by computing a weighted average of the most frequently displayed video feeds during its corresponding time period (e.g., video feeds associated with the first sequence of video feeds viewed by the end user may be more heavily weighted).

In step 684, a replay sequence is outputted. The replay sequence may include an identification of each of the one or more video feeds with a corresponding time period of the one or more time periods. As the video feeds associated with the replay sequence have already been buffered on mobile devices at the venue by the time the replay sequence is outputted, only an identification of each of the one or more video feeds in the replay sequence may be transmitted or broadcast to a particular group of mobile devices to which the replay sequence is to be displayed. Thus, in some embodiments, the video feeds associated with the replay sequence are not rebroadcast to a plurality of mobile devices, but instead video feeds that have already been buffered on each of the plurality of mobile devices individually are replayed based on a transmission of a replay sequence comprising identifications of each of the one or more video feeds to be replayed. In some cases, a controlling mobile device (or master device) of the plurality of mobile devices may provide the replay time frame, the replay sequence, and a synchronization signal for beginning the display of the replay sequence.

In some embodiments, each of the mobile devices within a group of mobile devices may periodically transmit (e.g., every 5 seconds) a video feed identification associated with a video feed being displayed on the mobile device. Thus, a mobile device of the group of mobile devices may periodically receive video feed identification information associated with each of the mobile devices within the group of mobile devices. As such, the replay sequence may be determined locally on each mobile device without acquiring additional communication between the group of mobile devices. The replay synchronization signal and the replay time frame may be transmitted to the group of mobile devices via a controlling mobile device of the group of mobile devices.

Figure 6E:
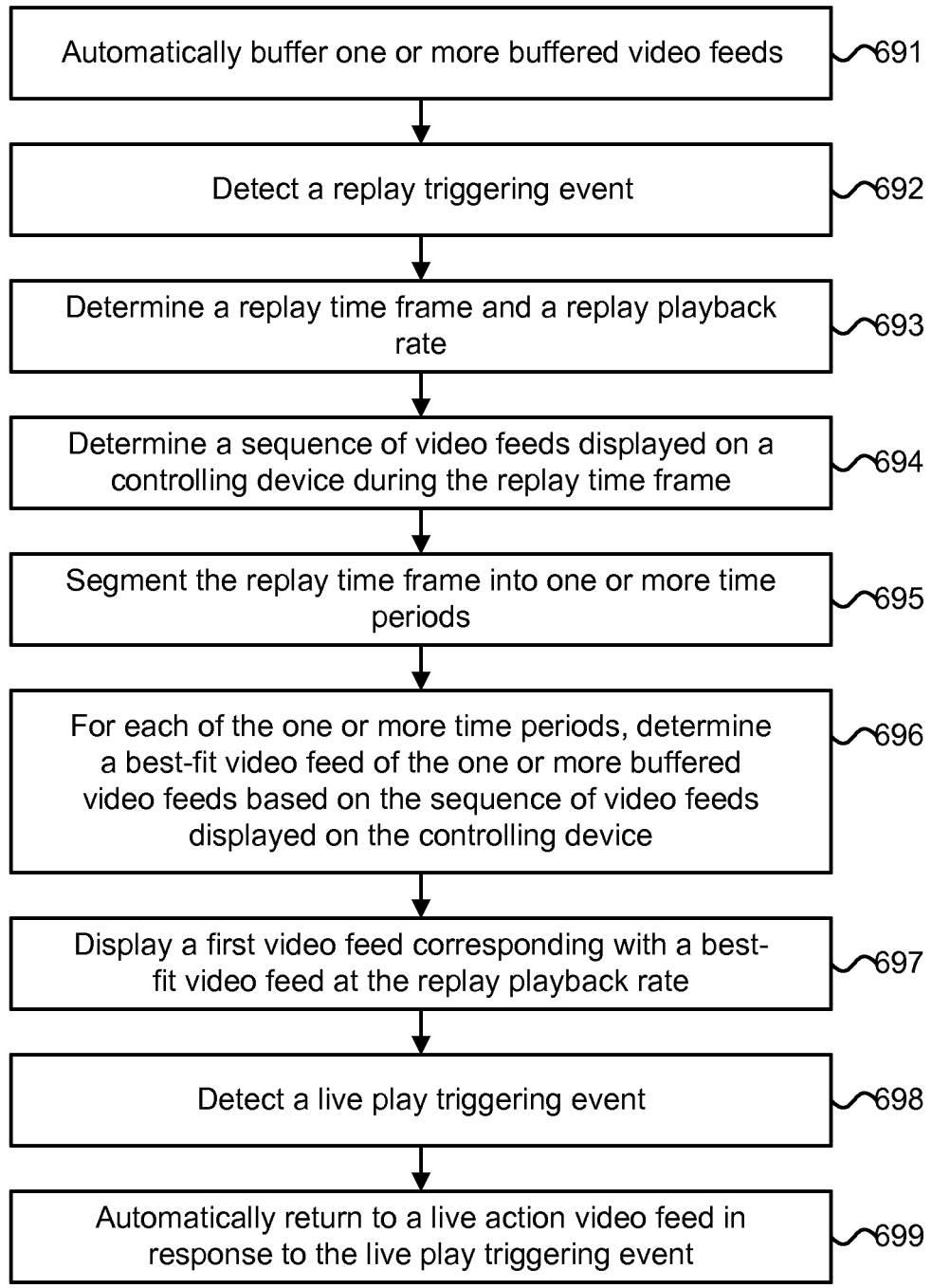
FIG. 6E is a flowchart describing one embodiment of a process for displaying a replay sequence.

FIG. 6E is a flowchart describing one embodiment of a process for displaying a replay sequence. The process described in FIG. 6E is one example of a process for implementing step 616 in FIG. 6A. In one embodiment, the process of FIG. 6E is performed by a mobile device, such as mobile device 16 in FIG. 1.

In step 691, one or more buffered video feeds are automatically buffered. The one or more buffered video feeds may be automatically buffered based on the viewing behavior of an end user of a mobile device and/or the viewing behaviors of a group of other end users using other mobile devices at a live event. In step 692, a replay triggering event is detected. In one example, the replay triggering event may be detected via a replay flag transmitted from a head end, such as head end 12 in FIG. 1. In another example, the replay triggering event may be detected based on a game clock being stopped or paused during a live sporting event.

In step 693, a replay time frame and a replay playback rate are determined. The replay time frame and the replay playback rate may be set prior to a replay triggering event by an end user of a mobile device or via a controlling mobile device within a group of mobile devices. In step 694, a sequence of video feeds displayed on a controlling device during the replay time frame is determined. In one embodiment, the controlling device may transmit video feed identifiers corresponding with the sequence of video feeds. In step 695, the replay time frame may be segmented into one or more time periods. In one embodiment, the replay time frame may be segmented into 5 second time periods. In this case, transitions between different video feeds will occur at most every 5 seconds.

In step 696, for each of the one or more time periods, a best-fit video feed of the one or more buffered video feeds is determined based on the sequence of video feeds displayed on the controlling device. In one embodiment, for each of the one or more time periods, a particular video feed of the sequence of video feeds is determined based on the most popular video feed displayed on the controlling device during the particular time period. Once the particular video feed is determined, then a best-fit video feed of the one or more buffered video feeds buffered on a mobile device may be determined by comparing a particular video feed vector associated with the particular video feed with each feed vector associated with each of the one or more buffered video feeds and determining the closest match to the particular video feed. The best-fit video feed may differ from the particular video feed if the particular video feed was not selected as one of the video feeds that were automatically buffered on the mobile device during the replay time frame.

In step 697, a first video feed corresponding with a best-fit video feed is displayed at the replay playback rate. In step 698, a live play triggering event is detected. In one embodiment, the live play triggering event may correspond with the beginning of or restarting of the game clock at a live sporting event. In step 699, a live action video feed is displayed in response to the live play triggering event. Upon detection of the live play triggering event, a mobile device may stop displaying the replay videos and automatically return to a live action video feed.

Figure 7A:
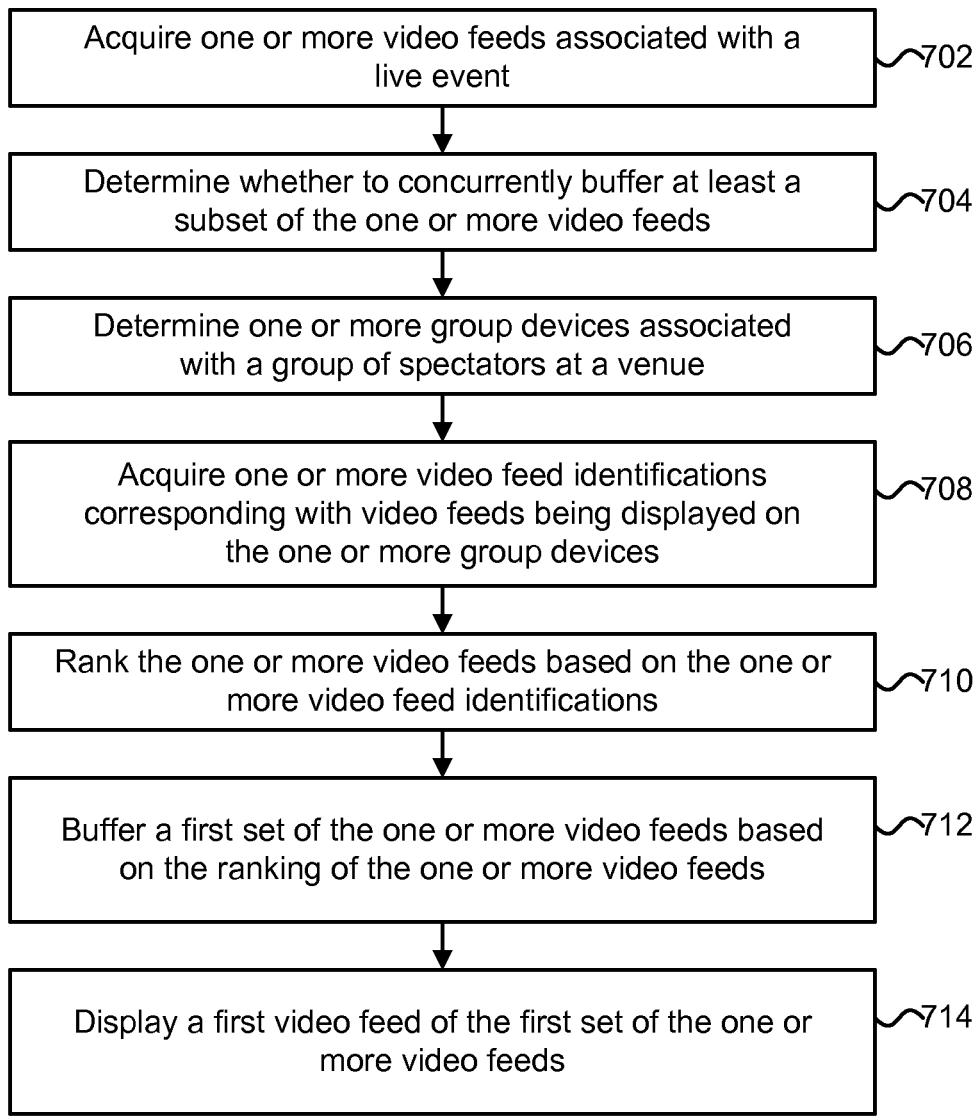
FIG. 7A is a flowchart describing one embodiment of a process for selectively buffering and displaying video feeds based on the viewing behavior of a group of end users associated with a group of mobile devices at a live event.

FIG. 7A is a flowchart describing one embodiment of a process for selectively buffering and displaying video feeds based on the viewing behavior of a group of end users associated with a group of mobile devices at a live event. In one embodiment, the process of FIG. 7A is performed by a mobile device, such as mobile device 16 in FIG. 1.

In step 702, one or more video feeds associate with a live event are acquired. The one or more video feeds may be received from a head end, such as head end 12 in FIG. 1. Each of the one or more video feeds may correspond with images associated with a particular camera at the live event. In step 704, it is determined whether to concurrently buffer at least a subset of the one or more video feeds. In some cases, a mobile device may not buffer any of the one or more video feeds. In one example, a prolonged period of delay between portions of a live sporting event (e.g., during halftime of a football game) or inactivity by an end user of a mobile device for a prolonged period of time (e.g., the end user has not looked at or operated the mobile device for a period of time) may cause the mobile device to enter into a non-buffering state in order to conserve battery lifetime.

In step 706, one or more group devices associated with a group of spectators at the live event are determined. In one embodiment, the one or more group devices may include a number of mobile computing devices within a particular area of a venue hosting the live event. For example, the one or more group devices may comprise mobile devices located within a particular seating section at the venue.

In one embodiment, the one or more group devices may be determined based on various characteristics of the one or more end users of the one or more group devices. The various characteristics may include a physical location associated with each of the group members (e.g., each of the group members may be located within a particular seating section of the venue), one or more common interests (as provided in user profiles associated with each of the group members), and/or a degree of closeness associated with a social graph or social networking graph.

In step 708, one or more video feed identifications corresponding with video feeds being displayed on the one or more group devices are acquired. The one or more video feed identifications may be acquired from an aggregation server which aggregates video feed identifications from the one or more group devices as the one or more group devices display the corresponding video feeds. The one or more video feed identifications may also be acquired directly from each of the one or more group devices as the one or more group devices display corresponding video feeds.

In step 710, the one or more video feeds are ranked based on the one or more video feed identifications. In one embodiment, the one or more video feeds are ranked based on the popularity of or the frequency of the video feeds displayed on the one or more group devices. In step 712, a first set of the one or more video feeds are buffered based on the ranking of the one or more video feeds. In step 714, a first video feed of the first set of the one or more video feeds is displayed. The first video feed may be displayed on a mobile device, such as mobile device 16 in FIG. 1.

Figure 7B:
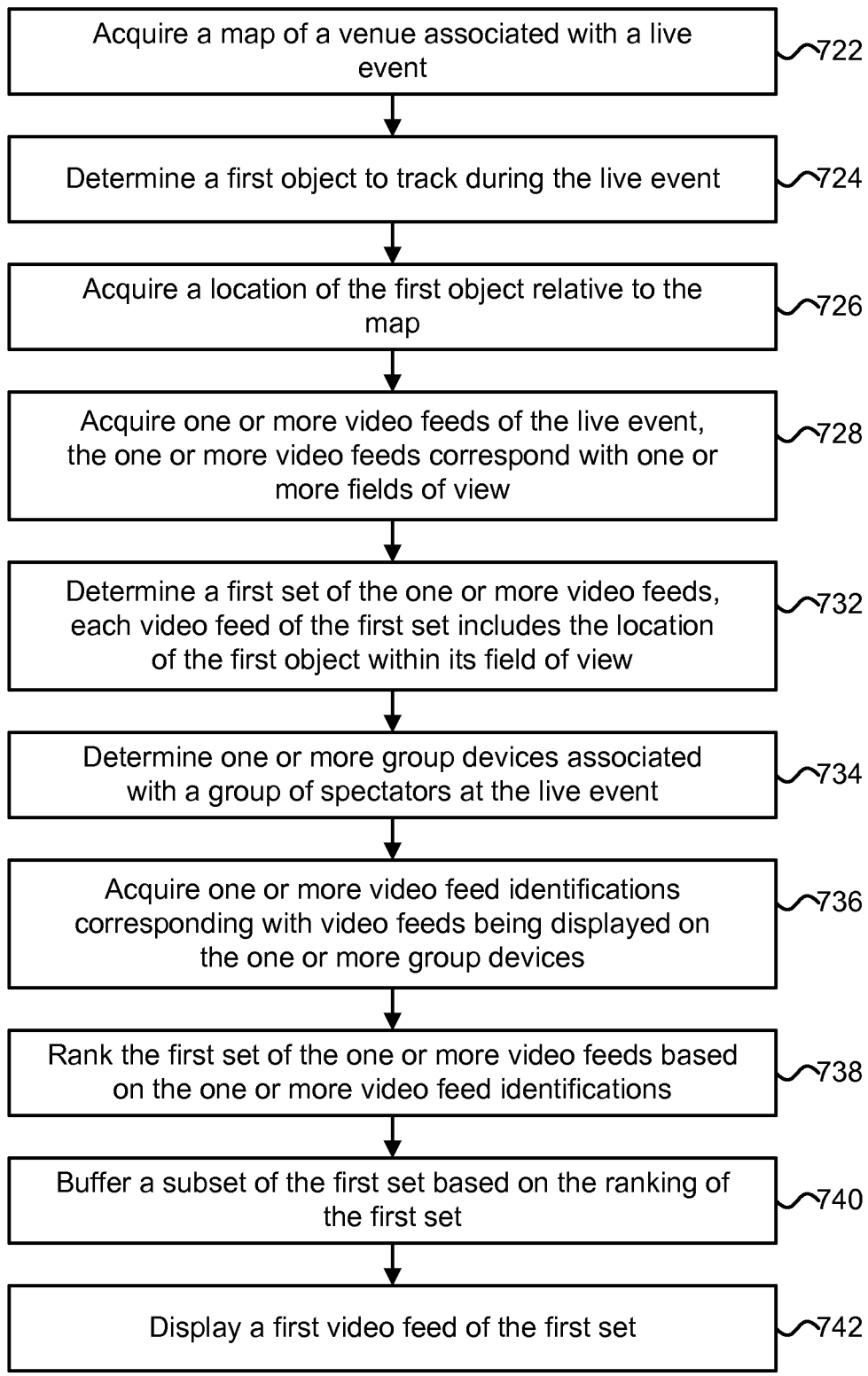
FIG. 7B is a flowchart describing one embodiment of a process for selectively buffering and displaying video feeds based on object tracking information.

FIG. 7B is a flowchart describing one embodiment of a process for selectively buffering and displaying video feeds based on object tracking information. In one embodiment, the process of FIG. 7B is performed by a mobile device, such as mobile device 16 in FIG. 1.

In step 722, a map of a venue associate with a live event is acquired. The map of the venue may be acquired from a head end, such as head end 12 in FIG. 1. In step 724, a first object to track during the live event is determined. The first object may comprise a particular player participating in the live event or an object associated with the live event (e.g., a soccer ball or hockey puck). In step 726, a location of the first object relative to the map is acquired. The location of the first object may be specified via a wireless transmission from the head end. In step 728, one or more video feeds of the live event are acquired. The one or more video feeds may be acquired via a wireless transmission from the head end. The one or more video feeds may correspond with one or more fields of view. Each of the one or more fields of view may correspond with a particular camera capturing video information at the live event.

In step 732, a first set of the one or more video feeds is determined. Each video feed of the first set may include the location of the first object within its field of view. In this case, each video feed of the first set includes the first object within its field of view. In step 734, one or more group devices associated with a group of spectators at the live event are determined. In step 736, one or more video feed identifications corresponding with video feeds being displayed on the one or more group devices are acquired. In step 738, the first set of the one or more video feeds is ranked based on the one or more video feed identifications. In step 740, a subset of the first set is buffered based on the ranking of the first set. In step 742, a first video feed of the first set is displayed. The first video feed may be displayed on a mobile device, such as mobile device 16 in FIG. 1.

Figure 7C:
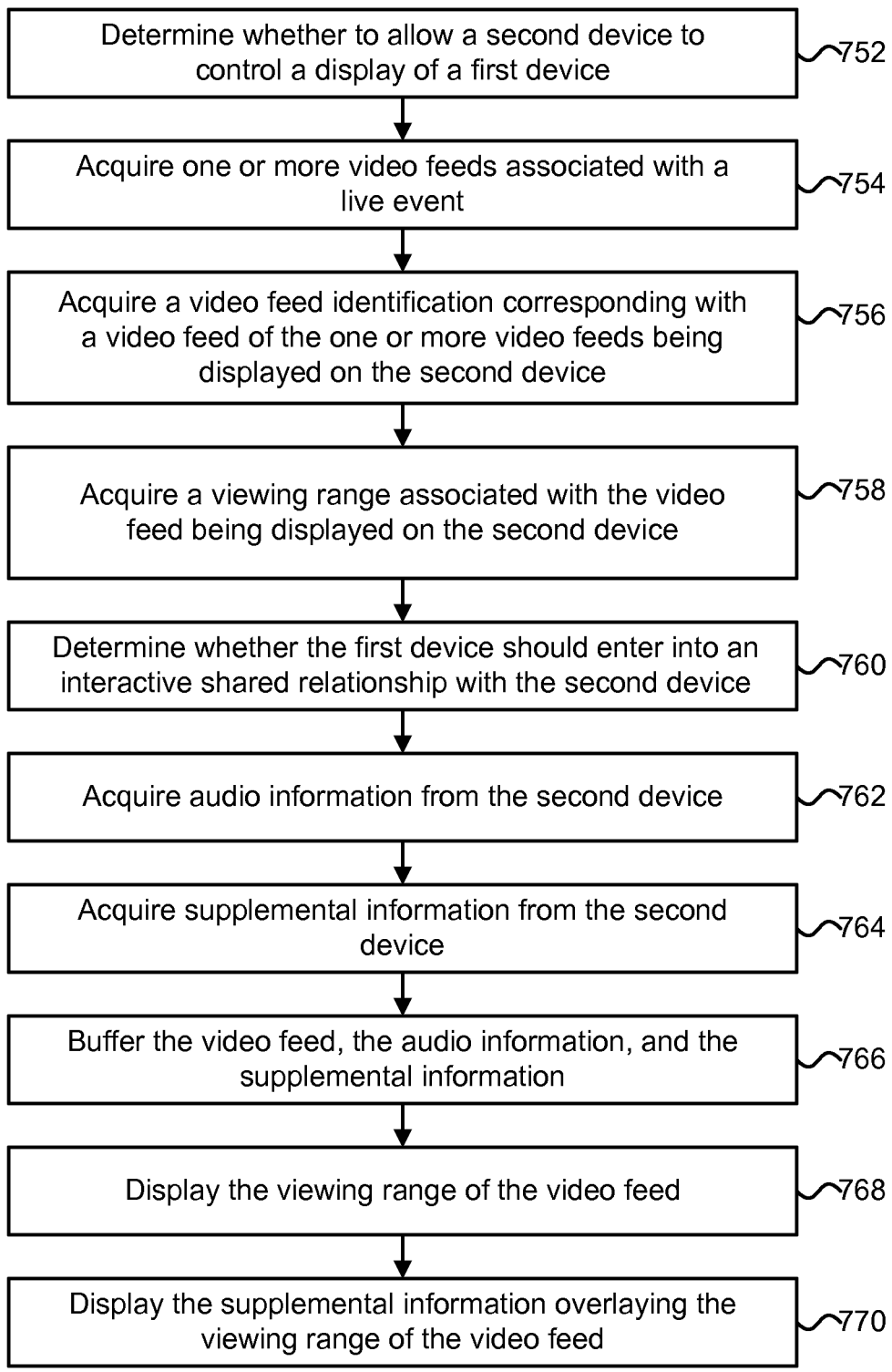
FIG. 7C is a flowchart describing one embodiment of a process sharing video feed information, audio information, and supplemental information between mobile devices at a live event.

FIG. 7C is a flowchart describing one embodiment of a process sharing video feed information, audio information, and supplemental information between mobile devices at a live event. In one embodiment, the process of FIG. 7B is performed by a mobile device, such as mobile device 16 in FIG. 1.

In step 752, it is determined whether to allow a second device to control a display of a first device. The first device may enter into a subservient relationship with the second device with respect to the display of live video feeds and/or video feeds associated with a replay sequence upon approval by an end user of the first device. Allowing the second device to control what is displayed and/or buffered on the first device allows an end user of the first device to view the live event on the first device without having to actively operate the first device. In step 754, one or more video feeds associated with a live event are acquired by the first device. In step 756, a video feed identification corresponding with a video feed of the one or more video feeds being displayed on the second device is acquired. The video feed identification may be transmitted to the first device via a head end, such as head end 12 in FIG. 1, or directly from the second device via a wireless connection (e.g., a WiFi connection).

In step 758, a viewing range associated with the video feed being displayed on the second device is acquired. The viewing range may correspond with a zoomed-in region of the video feed as displayed on the second device. The viewing range may be specified using rectangular coordinates (e.g., a lower-left coordinate and an upper-right coordinate of the viewing range). In step 760, it is determined whether the first device should enter into an interactive shared relationship with the second device. In step 762, audio information is acquired from the second device. The audio information may correspond with audio commentary from a second end user of the second device. In step 764, supplemental information is acquired from the second device. The supplemental information may correspond with written comments and/or event-related diagrams (e.g., gameplay diagrams) generated by the second end user of the second device.

In step 766, the video feed, the audio information, and the supplemental information are buffered on the first device. In step 768, the viewing range of the video feed is displayed on the first device. In this case, not only is the video feed being displayed on the first device, but the zoomed-in region being displayed on the second device is also being displayed on the first device. In step 770, the supplemental information is displayed on the first device overlaying the viewing range of the video feed. In one example, the supplemental information may comprise shared commentary, such as shared comment 587 in FIG. 5F.

Figure 8:
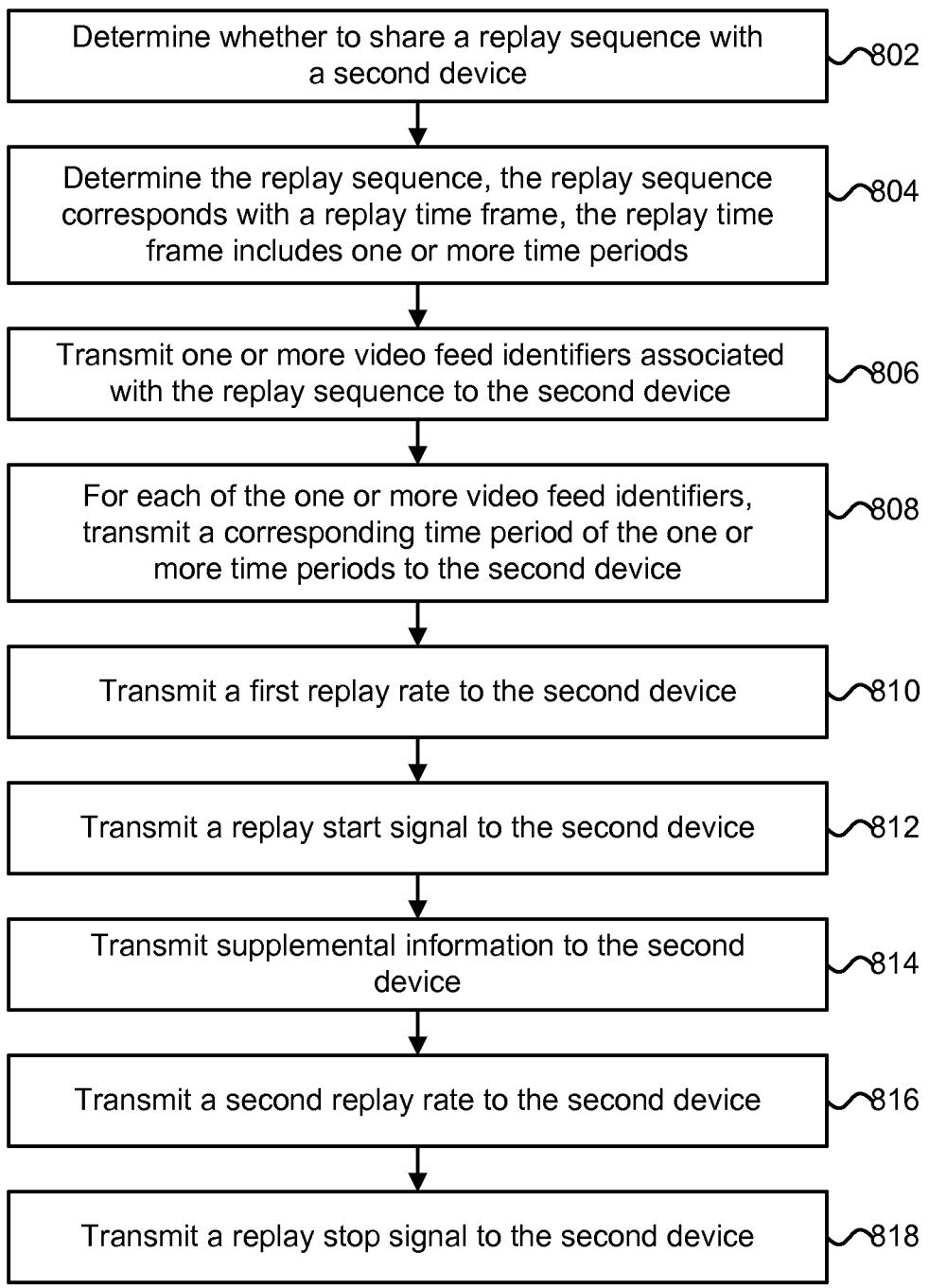
FIG. 8 is a flowchart describing one embodiment of a process controlling a replay sequence displayed on another mobile device.

FIG. 8 is a flowchart describing one embodiment of a process controlling a replay sequence displayed on another mobile device. In one embodiment, the process of FIG. 8 is performed by a mobile device, such as mobile device 16 in FIG. 1.

In step 802, it is determined whether to share a replay sequence with a second device. The second device may comprise a mobile device different from a controlling mobile device. In step 804, the replay sequence is determined. The replay sequence may be determined based on behavioral analysis of the viewing habits of a group of end users at a live event. The replay sequence may correspond with a replay time frame. The replay time frame may be segmented into one or more time periods. In step 806, one or more video feed identifiers associated with the replay sequence are transmitted to the second device.

In step 808, for each of the one or more video feed identifiers, a corresponding time period of the one or more time periods is transmitted to the second device. In step 810, a first replay rate (or replay playback rate) is transmitted to the second device. In step 812, a replay start signal is transmitted to the second device. In step 814, supplemental information is transmitted to the second device. In step 816, a second replay rate different from the first replay rate is transmitted to the second device. In this case, the replay rate associated with the replay sequence may be adjusted over time by transmitting an updated replay rate to the second device. In step 818, a replay stop signal is transmitted to the second device. In this case, the display of the replay sequence may be started on the second device via the replay start signal and stopped on the second device via the replay stop signal.

Figure 9:
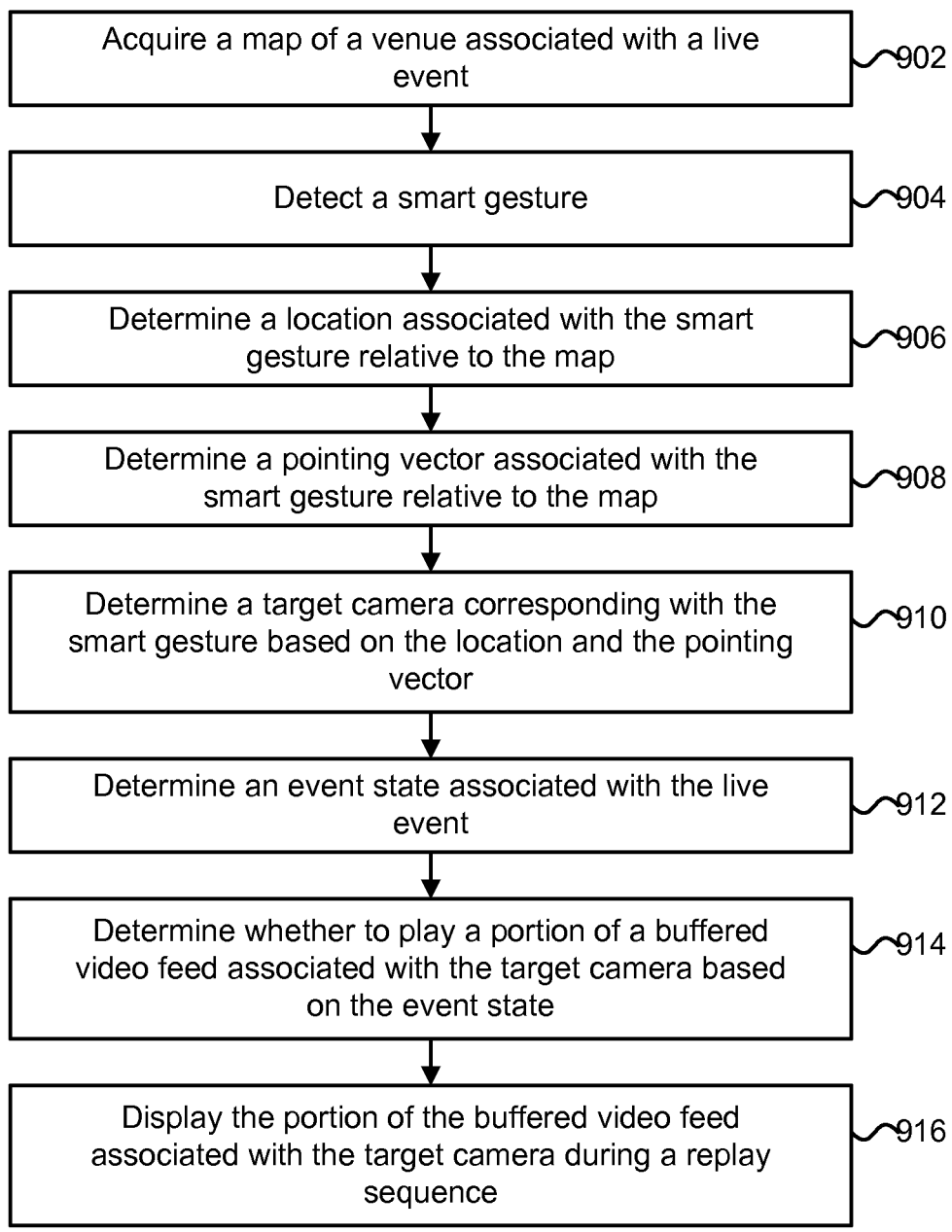
FIG. 9 is a flowchart describing one embodiment of a process for setting a target camera or target viewing angle using a smart gesture.

FIG. 9 is a flowchart describing one embodiment of a process for setting a target camera or target viewing angle using a smart gesture. In one embodiment, the process of FIG. 9 is performed by a mobile device, such as mobile device 16 in FIG. 1.

In step 902, a map of a venue associated with a live event is acquired. The map of the venue may comprise a three-dimensional model of the venue. In step 904, a smart gesture is detected. The smart gesture may comprise a particular physical gesture such as orienting a mobile device and then flicking (or making a sudden movement) the mobile device forward by a particular amount. The smart gesture may also comprise a static gesture involving pointing a mobile device in a particular direction. In some embodiments, the smart gesture may comprise a combination of static gestures and dynamic gestures (e.g., particular movements of the mobile device). In step 906, a location associated with the smart gesture is determined relative to the map. In one embodiment, the location associated with the smart gesture may be determined by acquiring GPS location information from the mobile device with which the smart gesture was performed.

In step 908, a pointing vector associated with the smart gesture is determined relative to the map. In one embodiment, the pointing vector may be determined by acquiring velocity information, acceleration information, and/or orientation information from the mobile device with which the smart gesture was performed. The mobile device may include an inertial measurement unit (IMU) in order to provide the velocity information, acceleration information, and/or orientation information associated with the mobile device. In step 910, a target camera corresponding with the smart gesture is determined based on the location determined in step 906 and the pointing vector determined in step 908. In one embodiment, the target camera may correspond with a camera at the live event that is positioned closest to the direction of the smart gesture based on the location and the pointing vector. A smart gesture may be used for selecting a source location (e.g., a particular camera) or for selecting a target location (e.g., a particular area of a playing field such as an end zone at a football game).

In step 912, an event state associated with the live event is determined. The event state may be used to determine whether action at a live sporting event is currently occurring or if there is a break in the action (e.g., a break in the live action due to a timeout). In one embodiment, the event state may correspond with a game clock of a live sporting event. For example, if the game clock is ticking, then the action may be deemed to be currently occurring. On the other hand, if the game clock is not ticking (or is stopped), then the action may be deemed to not be currently occurring. The event state may be used to determine whether a live video feed or a replay video feed is displayed on a mobile device. In one example, if a timeout or other break in the action is occurring, then a replay video may be presented on a mobile device. Otherwise, if there is not a break in the action, then a live action video may be presented on the mobile device.

In step 914, it is determined whether to play a portion of the buffered video feed associated with the target camera based on the event state. In one embodiment, the event state may be associated with a break in the action at a live sporting event (e.g., a commercial break). During a break in the action, a replay may be displayed on a mobile device corresponding with the portion of the buffered video feed associated with the target camera. On the other hand, if the event state is not associated with a break in the action, then a replay may not be displayed on the mobile device. In some embodiments, the smart gesture detected in step 904 may be used to control both the target camera associated with the display of a live video feed and the target camera associated with the display of a replay. In step 916, the portion of the buffered video feed associated with the target camera is displayed during a replay sequence.

One embodiment of the disclosed technology includes acquiring a plurality of video feeds of a live event as the live event occurs, acquiring viewing information associated with one or more group devices at the live event, configuring the mobile device to display at least a portion of a first video feed of the plurality of video feeds based on the viewing information, and displaying on the mobile device the at least a portion of the first video feed.

One embodiment of the disclosed technology comprises a mobile device including a receiver, one or more processors, and a display. The receiver receives a plurality of video feeds of the live event as the live event occurs and receives viewing information associated with one or more group devices at the live event. The one or more group devices include a second computing device different from the mobile device. The one or more processors configure the mobile device to display at least a portion of a first video feed of the plurality of video feeds based on the viewing information. The display displays the at least a portion of the first video feed.

One embodiment of the disclosed technology includes acquiring a plurality of video feeds of a live event as the live event occurs, determining one or more group devices at the live event, acquiring viewing information associated with the one or more group devices, buffering one or more video feeds of the plurality of video feeds on the mobile device, determining a first video feed of the one or more video feeds based on the viewing information associated with the one or more group devices, and displaying on the mobile device at least a portion of the first video feed.

One embodiment of the disclosed technology includes acquiring a plurality of video feeds of a live event as the live event occurs, determining a location of the mobile device within a venue hosting the live event, determining a target region within the venue, determining a first video feed of the plurality of video feeds based on the location of the mobile device and the target region, and displaying on the mobile device at least a portion of the first video feed.

One embodiment of the disclosed technology comprises a mobile device including a receiver, one or more processors, and a display. The receiver receives a plurality of video feeds of a live event as the live event occurs. The one or more processors determine a location of the mobile device within a venue hosting the live event and determine a target region within the venue. The one or more processors determine a first video feed of the plurality of video feeds based on the location of the mobile device and the target region. The display displays at least a portion of the first video feed.

One embodiment of the disclosed technology includes acquiring a map of a venue associated with a live event, determining a first object to track during the live event, acquiring an object location of the first object relative to the map, determining a target region within the venue based on the object location, determining a location of the mobile device relative to the map, acquiring a plurality of video feeds of the live event as the live event occurs, determining a first video feed of the plurality of video feeds based on the location of the mobile device and the target region, and displaying on the mobile device at least a portion of the first video feed.

One embodiment of the disclosed technology includes acquiring a plurality of video feeds of a live event as the live event occurs, detecting a physical gesture using the mobile device, configuring the mobile device to display at least a portion of a first video feed of the plurality of video feeds based on the physical gesture, and displaying on the mobile device the at least a portion of the first video feed.

One embodiment of the disclosed technology comprises a mobile device including a receiver, one or more processors, and a display. The receiver receives a plurality of video feeds of the live event as the live event occurs. The one or more processors detect a physical gesture using the mobile device and configure the mobile device to display at least a portion of a first video feed of the plurality of video feeds based on the physical gesture in response to detecting the physical gesture. The display displays the at least a portion of the first video feed.

One embodiment of the disclosed technology includes acquiring a plurality of video feeds of a live event as the live event occurs, buffering the plurality of video feeds on the mobile device, detecting a physical gesture involving the mobile device, determining a target camera corresponding with the physical gesture, determining an event state associated with the live event, determining whether to display a portion of a buffered video feed of the plurality of video feeds associated with the target camera based on the event state, and displaying on the mobile device the portion of the buffered video feed associated with the target camera.

One embodiment of the disclosed technology includes acquiring a plurality of video feeds of the live event as the live event occurs, buffering one or more video feeds of the plurality of video feeds on a mobile device, determining one or more group devices at the live event, acquiring viewing information associated with the one or more group devices, detecting a replay triggering event, determining a replay time frame, and determining a replay sequence based on the viewing information associated with the one or more group devices. The replay sequence includes a first buffered video feed of the one or more video feeds. The method further includes displaying on the mobile device the replay sequence.

One embodiment of the disclosed technology comprises a mobile device including a receiver, a memory, one or more processors, and a display. The receiver receives a plurality of video feeds of the live event as the live event occurs. The memory stores a map of a venue associated with the live event. The map includes field of view information associated with a first video feed of the plurality of video feeds. The field of view information associated with the first video feed includes a first location and a first direction relative to the map of the venue. The one or more processors select the first video feed based on the first location and the first direction relative to the map of the venue, and determine one or more video feeds of the plurality of video feeds to be concurrently buffered on the mobile device. The one or more video feeds include the first video feed. The one or more processors detect a replay triggering event, determine a replay time frame in response to detecting the replay triggering event, and determine a replay sequence in response to detecting the replay triggering event based on the viewing behaviors of a group of other end users using other mobile devices at the live event. The display displays the replay sequence.

One embodiment of the disclosed technology includes acquiring a plurality of video feeds of the live event as the live event occurs and determining one or more group devices at the live event. The determining one or more group devices includes determining the one or more group devices based on a physical location of each of the one or more group devices at the live event. The method further includes buffering one or more video feeds of the plurality of video feeds on a mobile device, acquiring viewing information associated with the one or more group devices, determining a first video feed of the plurality of video feeds based on the viewing information associated with the one or more group devices, and displaying on the mobile device the first video feed.

One embodiment of the disclosed technology includes acquiring one or more video feeds associated with the live event, determining one or more group devices associated with a group of spectators at the live event, acquiring one or more video feed identifications corresponding with video feeds displayed on the one or more group devices, ranking the one or more video feeds based on the one or more video feed identifications, and automatically buffering a first set of the one or more video feeds based on the ranking of the one or more video feeds.

One embodiment of the disclosed technology comprises a mobile device including a receiver, one or more processors, and a memory buffer. The receiver receives a plurality of video feeds of the live event as the live event occurs. The one or more processors determine one or more group devices associated with a group of spectators at the live event, acquire one or more video feed identifications corresponding with video feeds displayed on the one or more group devices, rank the plurality of video feeds based on the one or more video feed identifications, and determine a first set of the plurality of video feeds based on the ranking of the plurality of video feeds. The memory buffer stores the first set of the plurality of video feeds.

One embodiment of the disclosed technology includes acquiring a map of a venue associated with the live event, determining a first object to track during the live event, acquiring a location of the first object relative to the map, acquiring one or more video feeds of the live event, the one or more video feeds correspond with one or more fields of view, determining a first set of the one or more video feeds, each video feed of the first set includes the location of the first object within its field of view, determining one or more group devices associated with a group of spectators at the live event, acquiring one or more video feed identifications corresponding with video feeds displayed on the one or more group devices, ranking the first set of the one or more video feeds based on the one or more video feed identifications, and automatically buffering a subset of the first set based on the ranking of the first set.

One embodiment of the disclosed technology includes acquiring a map of a venue associated with a live event, detecting the physical gesture, determining a location associated with the physical gesture relative to the map, determining a pointing vector associated with the physical gesture relative to the map, determining a target camera corresponding with the physical gesture based on the location and a pointing vector, determining an event state associated with the live event, determining whether to play a portion of a buffered video feed associated with the target camera based on the event state, and displaying the portion of the buffered video feed associated with the target camera.

One embodiment of the disclosed technology includes determining a controlling device of a mobile device, receiving one or more video feeds associated with the live event at the mobile device, acquiring a video feed identification corresponding with a video feed of the one or more video feeds displayed on the controlling device, acquiring a viewing range associated with the video feed being displayed on the controlling device, buffering the video feed, and displaying the viewing range of the video feed.

One embodiment of the disclosed technology includes determining one or more group devices associated with a group of spectators at the live event, acquiring a plurality of video feeds associated with the live event, acquiring one or more video feed identifications corresponding with one or more video feeds displayed on the one or more group devices, determining a video feed of the plurality of video feeds based on the one or more video feed identifications, acquiring supplemental information from the one or more group devices, buffering the video feed and the supplemental information, displaying the video feed on the mobile device, and displaying on the mobile device the supplemental information overlaying the video feed.

For purposes of this document, each process associated with the disclosed technology may be performed continuously and by one or more computing devices. Each step in a process may be performed by the same or different computing devices as those used in other steps, and each step need not necessarily be performed by a single computing device.

For purposes of this document, reference in the specification to "an embodiment," "one embodiment," "some embodiments," or "another embodiment" are used to described different embodiments and do not necessarily refer to the same embodiment.

For purposes of this document, a connection can be a direct connection or an indirect connection (e.g., via another part).

For purposes of this document, the term "set" of objects, refers to a "set" of one or more of the objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for displaying video on a mobile device, comprising:
    acquiring a plurality of video feeds of a live event as the live event occurs;
    buffering the plurality of video feeds on the mobile device;
    determining one or more group devices based on a physical location of each of the one or more group devices at the live event, the one or more group devices include a second mobile device different from the mobile device;
    detecting that a break in action at the live event has occurred;
    determining at the mobile device a replay sequence in response to detecting that the break in action at the live event has occurred, the determining a replay sequence includes determining a plurality of time periods corresponding with a replay time frame for the replay sequence and determining a video feed identifier for each time period of the plurality of time periods based on a most frequently displayed video feed of the plurality of video feeds previously displayed on the one or more group devices;
    transmitting from the mobile device a replay synchronization signal for beginning the display of the replay sequence to the one or more group devices;
    transmitting from the mobile device a plurality of video feed identifiers corresponding with the replay sequence to the one or more group devices; and
    displaying on the mobile device and the one or more group devices portions of the plurality of video feeds corresponding with the replay sequence in response to transmitting the replay synchronization signal, the portions of the plurality of video feeds corresponding with the replay sequence are displayed on the mobile device and the one or more group devices at substantially the same time.

2. The method of claim 1, wherein:
    the live event comprises a sporting event.

3. The method of claim 1, wherein:
    the replay time frame comprises a 30 second time window.

4. The method of claim 1, wherein:
    the live event comprises a sporting event; and
    the detecting that a break in action at the live event has occurred includes determining whether a timeout has been called during the sporting event.

5. The method of claim 1, wherein:
    the detecting that a break in action at the live event has occurred includes determining whether a game clock associated with the live event is stopped.

6. The method of claim 1, wherein:
    the determining the one or more group devices includes determining GPS locations associated with each of the one or more group devices.

7. The method of claim 1, further comprising:
    transmitting from the mobile device the replay time frame to the one or more group devices.

8. A mobile device for displaying video associated with a live event, comprising:
    a receiver configured to receive a plurality of video feeds of the live event as the live event occurs;
    a buffer configured to buffer the plurality of video feeds on the mobile device as the live event occurs;
    one or more processors configured to determine one or more group devices based on a physical location of each of the one or more group devices at the live event, the one or more group devices include a second mobile device different from the mobile device, the one or more processors configured to detect that a break in action at the live event has occurred and determine a replay sequence in response to detecting that the break in action at the live event has occurred, the one or more processors configured to determine a plurality of time periods corresponding with a replay time frame for the replay sequence and determine a video feed identifier for each time period of the plurality of time periods based on a most frequently displayed video feed of the plurality of video feeds previously displayed on the one or more group devices, the one or more processors configured to cause a replay synchronization signal for beginning the display of the replay sequence and the replay sequence to be transmitted to the one or more group devices; and
    a display configured to display portions of the plurality of video feeds corresponding with the replay sequence in response to transmission of the replay synchronization signal to the one or more group devices, the portions of the plurality of video feeds corresponding with the replay sequence are displayed on the mobile device and the one or more group devices at substantially the same time.

9. The mobile device of claim 8, wherein:
    the one or more processors configured to cause a plurality of video feed identifiers corresponding with the replay sequence to be transmitted to the one or more group devices; and
    the replay time frame comprises a 30 second time window.

10. The mobile device of claim 8, wherein:
    the one or more processors configured to determine the one or more group devices based on GPS locations associated with each of the one or more group devices.

11. The mobile device of claim 8, wherein:
    the one or more processors configured to detect that the break in action at the live event has occurred by detecting that a game clock associated with the live event is stopped.

12. The mobile device of claim 8, wherein:
    the one or more processors configured to cause the replay time frame to be transmitted to the one or more group devices.

13. The mobile device of claim 8, wherein:
    the one or more processors configured to detect that each of the one or more group devices is located within a venue hosting the live event.

14. A method for displaying video on a mobile device, comprising:

acquiring a plurality of video feeds of a live event as the live event occurs;

buffering the plurality of video feeds on the mobile device as the live event occurs;

determining one or more group devices based on a physical location of each of the one or more group devices at the live event, the one or more group devices comprise a plurality of computing devices;

detecting that a break in action at the live event has occurred;

determining at the mobile device a replay sequence of the plurality of video feeds in response to detecting that the break in action at the live event has occurred, the determining a replay sequence includes determining a plurality of time periods corresponding with a replay time frame for the replay sequence and determining a video feed identifier for each time period of the plurality of time periods based on a most frequently displayed video feed of the plurality of video feeds previously displayed on the one or more group devices;

transmitting from the mobile device a replay synchronization signal for starting the display of the replay sequence on the one or more group devices and the replay sequence to the one or more group devices; and displaying on the mobile device and the one or more group devices portions of the plurality of video feeds corresponding with the replay sequence in response to transmitting the replay synchronization signal to the one or more group devices, the portions of the plurality of video feeds corresponding with the replay sequence are displayed on the mobile device and the one or more group devices at substantially the same time.

15. The method of claim 14, further comprising:

transmitting from the mobile device a plurality of video feed identifiers corresponding with the replay sequence to the one or more group devices.

16. The method of claim 15, wherein:

the one or more group devices include a second mobile device different from the mobile device.

17. The method of claim 15, wherein:

the determining the one or more group devices includes determining GPS locations associated with each of the one or more group devices.

18. The method of claim 14, wherein:

the detecting that a break in action at the live event has occurred includes detecting that a game clock associated with the live event has been stopped.

19. The method of claim 15, further comprising:

transmitting the replay sequence to the one or more group devices prior to transmitting the replay synchronization signal to the one or more group devices.

\* \* \* \* \*